US012711317B2

(12) United States Patent
Peng et al.

(10) Patent No.: US 12,711,317 B2
(45) Date of Patent: Aug. 18, 2026

(54) INTERACTING WITH A LANGUAGE MODEL USING EXTERNAL KNOWLEDGE AND FEEDBACK

(71) Applicant: Microsoft Technology Licensing, LLC, Redmond, WA (US)

(72) Inventors: Baolin Peng, Issaquah, WA (US); Michel Galley, Seattle, WA (US); Hao Cheng, Kirkland, WA (US); Pengcheng He, Sammamish, WA (US); Nguyen Hung Bach, Redmond, WA (US); Weizhu Chen, Kirkland, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 471 days.

(21) Appl. No.: 18/140,658

(22) Filed: Apr. 28, 2023

(65) Prior Publication Data

US 2024/0362418 A1 Oct. 31, 2024

(51) Int. Cl.
*G06F 40/40* (2020.01)
*G06F 16/332* (2019.01)

(52) U.S. Cl.
CPC .......... *G06F 40/40* (2020.01); *G06F 16/3325* (2019.01)

(58) Field of Classification Search
CPC .... G06F 40/40; G06F 16/3325; G06F 16/332; G06F 40/35; G06F 40/20; G06F 40/30
See application file for complete search history.

(56) References Cited

U.S. PATENT DOCUMENTS

| | | | | |
|---|---|---|---|---|
| 9,454,733 | B1 | 9/2016 | Purpura | |
| 12,067,366 | B1 * | 8/2024 | Heller | G06F 40/35 |
| 2014/0379353 | A1 * | 12/2014 | Boies | G10L 15/22 704/275 |
| 2018/0004729 | A1 * | 1/2018 | Qiu | G06F 40/205 |
| 2021/0217408 | A1 | 7/2021 | Hakkani-Tur et al. | |

(Continued)

OTHER PUBLICATIONS

Gupta, "Compression of Deep Learning Models for Text: A Survey," arXiv, arXiv:2008.05221v4 [cs.CL], Jun. 13, 2021, 53 pages.

(Continued)

*Primary Examiner* — Huyen X Vo
(74) *Attorney, Agent, or Firm* — Alleman Hall LLP

(57) ABSTRACT

A technique supplements a language model with knowledge information retrieved from external sources. The technique operates by: receiving a query; receiving knowledge information based on the query; generating original model-input information that includes the query and the knowledge information; and presenting the original model-input information to the language model. The technique further includes: receiving an original response from the language model; generating a usefulness measure that identifies usefulness of the original response; and determining whether the usefulness measure satisfies a prescribed test. Upon determining that the usefulness measure does not satisfy the test, the technique includes: generating revised model-input information that includes feedback information; presenting the revised model-input information to the language model; and receiving a revised response from the language model. According to some implementations, the technique eliminates or reduces artificial hallucination exhibited by the language model.

20 Claims, 12 Drawing Sheets

(56) References Cited

U.S. PATENT DOCUMENTS

2022/0147861 A1 5/2022 Oltramari et al.
2022/0189474 A1 6/2022 Sharifi
2022/0374479 A1 11/2022 Xiong et al.
2023/0112921 A1 4/2023 Cai
2024/0273345 A1 8/2024 Bharadwaj
2024/0354319 A1* 10/2024 Dinu .................. G06F 16/3329
2024/0362422 A1 10/2024 Callegari

OTHER PUBLICATIONS

Chen, et al., "Stabilized In-Context Learning with Pre-trained Language Models for Few Shot Dialogue State Tracking," arXiv, arXiv:2302.05932v1 [cs.CL], Feb. 12, 2023, 14 pages.
Santra, et al., "Frugal Prompting for Dialog Models," arXiv, arXiv:2305.14919v1 [cs.CL], May 24, 2023, 22 pages.
Banerjee, et al., "METEOR: An Automatic Metric for MT Evaluation with Improved Correlation with Human Judgments," in Proceedings of the ACL Workshop on Intrinsic and Extrinsic Evaluation Measures for Machine Translation and/or Summarization, Jun. 2005, pp. 65-72.
Bender, et al., "On the Dangers of Stochastic Parrots: Can Language Models Be Too Big?," in FAccT '21: Proceedings of the 2021 ACM Conference on Fairness, Accountability, and Transparency, Mar. 2021, pp. 610-623.
Bommasani, et al., "On the Opportunities and Risks of Foundation Models," in arXiv, Cornell University, arXiv:2108.07258v3 [cs.LG], Jul. 12, 2022, 214 pages.
Brown, et al., "Language Models are Few-Shot Learners," in 34th Conference on Neural Information Processing Systems (NeurIPS 2020), 2020, 25 pages.
Chowdhery, et al., "PaLM: Scaling Language Modeling with Pathways," in arXiv, Cornell University, arXiv:2204.02311v5 [cs.CL], Oct. 5, 2022, 87 pages.
Dinan, et al., "Wizard of Wikipedia: Knowledge-Powered Conversational agents," in arXiv, Cornell University, arXiv:1811.01241v2 [cs.CL], Feb. 21, 2019, 18 pages.
Eric, et al., "MultiWOZ 2.1: A Consolidated Multi-Domain Dialogue Dataset with State Corrections and State Tracking Baselines," in arXiv, Cornell University, arXiv:1907.01669v4 [cs.CL], Dec. 3, 2019, 7 pages.
Galley, et al., "Grounded Response Generation Task at DSTC7," in Proceedings of the AAAI-19 Workshop on Dialog System Technology Challenges, 2018, 5 pages.
Scao, et al., "Bloom: A 176B-Parameter Open-Access Multilingual Language Model," arXiv, Cornell University, arXiv:2211.05100v2 [cs.CL], Dec. 11, 2022, 62.
Gao, et al., "Neural Approaches to Conversational AI," in arXiv, Cornell University, arXiv:1809.08267v3 [cs.CL], Sep. 10, 2019, 95 pages.
Ghazvininejad, et al., "A Knowledge-Grounded Neural Conversation Model," in arXiv, Cornell University, arXiv:1702.01932v2 [cs.CL], Nov. 15, 2018, 9 pages.
Glaese, et al., "Improving alignment of dialogue agents via targeted human judgements," ArXiv, in arXiv, Cornell University, arXiv:2209.14375v1 [cs.LG], Sep. 28, 2022, 77 pages.
Guu, et al., "REALM: Retrieval-Augmented Language Model Pre-Training," in arXiv, Cornell University, arXiv:2002.08909v1 [cs.CL], Feb. 10, 2020, 12 pages.
He, et al., "Rethinking with Retrieval: Faithful Large Language Model Inference," in arXiv, Cornell University, arXiv:2301.00303v1 [cs.CL], Dec. 31, 2022, 15 pages.
Karpukhin, et al., "Dense Passage Retrieval for Open-Domain Question Answering," in Proceedings of the 2020 Conference on Empirical Methods in Natural Language Processing (EMNLP), 2020, pp. 6769-6781.
Kim, et al., "Beyond Domain APIs: Task-oriented Conversational Modeling with Unstructured Knowledge Access," in Proceedings of the 21th Annual Meeting of the Special Interest Group on Discourse and Dialogue, Jul. 2020, pp. 278-289.
"DSTC11 Track 5—Task-oriented Conversational Modeling with Subjective Knowledge," available at https://github.com/alexa/dstc11-track5, Github, accessed on Mar. 23, 2023, 5 pages.
Lazaridou, et al., "Internet augmented language models through few-shot prompting for open-domain question answering," in arXiv, Cornell University, arXiv:2203.05115v2 [cs.CL], May 23, 2022, 20 pages.
Lewis, et al., "Retrieval-Augmented Generation for Knowledge-Intensive NLP Tasks," in arXiv, Cornell University, arXiv:2005.11401v4 [cs.CL], Apr. 12, 2021, 19 pages.
Lian, et al., "Learning to Select Knowledge for Response Generation in Dialog Systems," in arXiv, Cornell University, arXiv:1902.04911v2 [cs.CL], May 21, 2019, 7 pages.
Lin, et al., "Rouge: A Package for Automatic Evaluation of Summaries," in Text Summarization Branches Out, Association for Computational Linguistics, Jul. 2004, 8 pages.
Ma, et al., "Open-domain Question Answering via Chain of Reasoning over Heterogeneous Knowledge," in arXiv, Cornell University, arXiv:2210.12338v1 [cs.CL], Oct. 22, 2022, 15 pages.
Madaan, et al., "MemPrompt: Memory-assisted Prompt Editing with User Feedback," in arXiv, Cornell University, arXiv:2201.06009v7 [cs.CL], Feb. 18, 2023, 30 pages.
Nakano, et al., "WebGPT: Browser-assisted question answering with human feedback," in arXiv, Cornell University, arXiv:2112.09332v3 [cs.CL], Jun. 1, 2022, 32 pages.
Ouyang, et al., "Training language models to follow instructions with human feedback," in arXiv, Cornell University, arXiv:2203.02155v1 [cs.CL], Mar. 4, 2022, 68 pages.
Papineni, et al., "BLEU: a Method for Automatic Evaluation of Machine Translation," in Proceedings of the 40th Annual Meeting of the Association for Computational Linguistics (ACL), Jul. 2002, 8 pages.
Peng, et al., "GODEL: Large-Scale Pre-Training for Goal-Directed Dialog," in arXiv, Cornell University, arXiv:2206.11309v1 [cs.CL], Jun. 22, 2022, 14 pages.
Popovic, Maja, "CHRF: character n-gram F-score for automatic MT evaluation," in Proceedings of the Tenth Workshop on Statistical Machine Translation, Sep. 2015, pp. 392-395.
Radford, et al., "Improving Language Understanding by Generative Pre-Training," available at https://cdn.openai.com/research-covers/language-unsupervised/language_understanding_paper.pdf, OpenAI, Jun. 11, 2018, 12 pages.
Schick, et al., "Toolformer: Language Models Can Teach Themselves to Use Tools," in arXiv, Cornell University, arXiv:2302.04761v1 [cs.CL], Feb. 9. 2023, 17 pages.
Sellam, et al., "BLEURT: Learning Robust Metrics for Text Generation," in Proceedings of the 58th Annual Meeting of the Association for Computational Linguistics, Jul. 2020, pp. 7881-7892.
Shi, et al., "REPLUG: Retrieval-Augmented Black-Box Language Models," in arXiv, Cornell University, arXiv:2301.12652v2 [cs.CL], Feb. 1, 2023, 12 pages.
Shuster, et al., "Retrieval Augmentation Reduces Hallucination in Conversation," in arXiv, Cornell University, arXiv:2104.07567v1 [cs.CL], Apr. 15, 2021, 21 pages.
Shuster, et al., "BlenderBot 3: a deployed conversational agent that continually learns to responsibly engage," in arXiv, Cornell University, arXiv:2208.03188v3 [cs.CL], Aug. 10, 2022, 38 pages.
"Mesh Transformer JAX," available at https://github.com/kingoflolz/mesh-transformer-jax, Github, accessed on Mar. 23, 2023, 7 pages.
Weidinger, et al., "Ethical and social risks of harm from Language Models," in arXiv, Cornell University, arXiv:2112.04359v1 [cs.CL], Dec. 8, 2021, 64 pages.
Williams, Ronald J., "Simple Statistical Gradient-Following Algorithms for Connectionist Reinforcement Learning," in Machine Learning, May 1992, 27 pages.
Yeh, et al., "A Comprehensive Assessment of Dialog Evaluation Metrics," in arXiv, Cornell University arXiv:2106.03706v4 [cs.CL], Jul. 7, 2021, 23 pages.
Yuan, et al., "BARTScore: Evaluating Generated Text as Text Generation," in arXiv, Cornell University, arXiv:2106.11520v2 [cs.CL], Oct. 27, 2021, 18 pages.

(56) References Cited

OTHER PUBLICATIONS

Zhang, et al., "OPT: Open Pre-trained Transformer Language Model," in arXiv, Cornell University, arXiv:2205.01068v4 [cs.CL], Jun. 21, 2022, 30 pages.
Zhang, et al., "BERTScore: Evaluating Text Generation with BERT," in arXiv, Cornell University, arXiv:1904.09675v3 [cs.CL], Feb. 24, 2020, 43 pages.
Zhang, et al., "RetGen: A Joint Framework for Retrieval and Grounded Text Generation Modeling," in The Thirty-Sixth AAAI Conference on Artificial Intelligence (AAAI-22), Feb. 2022, p. 11739-11747.
Zhong, et al., "Training Language Models with Memory Augmentation," in arXiv, Cornell University, arXiv:2205.12674v3 [cs.CL], Nov. 29, 2022, 17 pages.
Peng, et al., "Check Your Facts and Try Again: Improving Large Language Models with External Knowledge and Automated Feedback," in arXiv, Cornell University, arXiv:2302.12813v3 [cs.CL], Mar. 8, 2023, 15 pages.
Shinn, et al., "Reflexion: an autonomous agent with dynamic memory and self-reflection," in arXiv, Cornell University, arXiv:2303.11366v1 [cs.AI], Mar. 20, 2023, 17 pages.
Wood, Thomas, "What is F-Score," available at https://deepai.org/machine-learning-glossary-and-terms/f-score, DeepAI, accessed on Mar. 29, 2023, 10 pages.
Sutton, et al., "Reinforcement Learning: An Introduction," draft version available at progresshttps://web.stanford.edu/class/psych209/Readings/SuttonBartolPRLBook2ndEd.pdf, 2nd Edition, 2015, MIT Press, 352 pages.
"Introducing The World's Largest Open Multilingual Language Model: BLOOM," available at https://bigscience.huggingface.co/blog/bloom, accessed on Feb. 13, 2023, 2 pages.
Galley, et al., "LLM-Augmenter," accessible at https://github.com/pengbaolin/LLM-Augmenter, Github, Feb. 24, 2023, 3 pages.
Gao, et al., "Neural approaches to conversational information retrieval," arXiv, Cornell University, arXiv:2201.05176v1, Jan. 13, 2022, 150 pages.
Madaan, et al., "Memory-assisted prompt editing to improve GPT-3 after deployment", arXiv, Cornell University, arXiv:2201.06009v1, Jan. 16, 2022, 14 pages.
Driess, et al., "Palm-e: An embodied multimodal language model", arXiv:2303.03378v1, Mar. 6, 2023, 18 pages.
Final Office Action mailed on Oct. 1, 2025, in U.S. Appl. No. 18/322,524, 22 pages.
Peng, et al., "Check your facts and try again: Improving large language models with external knowledge and automated feedback", arXiv:2302.12813v3, Mar. 8, 2023, 15 pages.

* cited by examiner

INTERACTING WITH A LANGUAGE MODEL USING EXTERNAL KNOWLEDGE AND FEEDBACK

BACKGROUND

Language models include machine-trained weights that encode knowledge expressed in a large corpus of training examples. By virtue of this characteristic, language models are often able to provide fluent, coherent, and useful responses to user queries. Language models are also capable of generalizing and extending knowledge expressed in the training examples. At other times, however, language models offer factually incorrect, nonsensical, meandering, and/or otherwise objectionable responses. This problem, referred to in field as artificial hallucination, sometimes reflects the language model's inability to synthesize knowledge in a manner that is appropriate for a current context. Alternatively, or in addition, the training examples that were used to train the language model do not express the knowledge required to answer the user's queries.

Attempts have been made to supplement a language model with external knowledge. Some attempts perform this task by fine-tuning the weights of the language model based on the external knowledge. However, this is solution is resource-intensive in nature. Furthermore, this solution does not scale well.

SUMMARY

A technique is described herein for supplementing a language model with knowledge information retrieved from one or more sources. In some implementations, the technique operates by: receiving a query; providing knowledge information based on the query; generating original model-input information that includes the query and the knowledge information; and presenting the original model-input information to the language model. The technique further includes: receiving an original response from the language model; generating a usefulness measure that identifies a degree of usefulness of the original response; and determining whether the usefulness measure satisfies a prescribed test. Upon determining that the usefulness measure does not satisfy the prescribed test, the technique includes: generating revised model-input information that includes feedback information; presenting the revised model-input information to the language model; and receiving a revised response from the language model. The technique repeats the above process until the language model generates a response that satisfies the prescribed test.

According to some implementations, the technique improves the quality of responses generated by the language model. The technique specifically eliminates or reduces artificial hallucination exhibited by the language model. This characteristic enables efficient dialogues between users and the language model, and improves the quality of any downstream application functions that depend on the use of the language model.

According to some implementations, the technique relies on a pre-trained language model, and does not require fine-tuning the weights of the language model. This characteristic allows a developer to forgo the time-intensive and resource-intensive task of revising the language model. This characteristic also provides a scalable solution to the problem of artificial hallucination, insofar as a developer need not repeatedly update the language model to incorporate new knowledge.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. Overview of the Computing System

Figure 1:
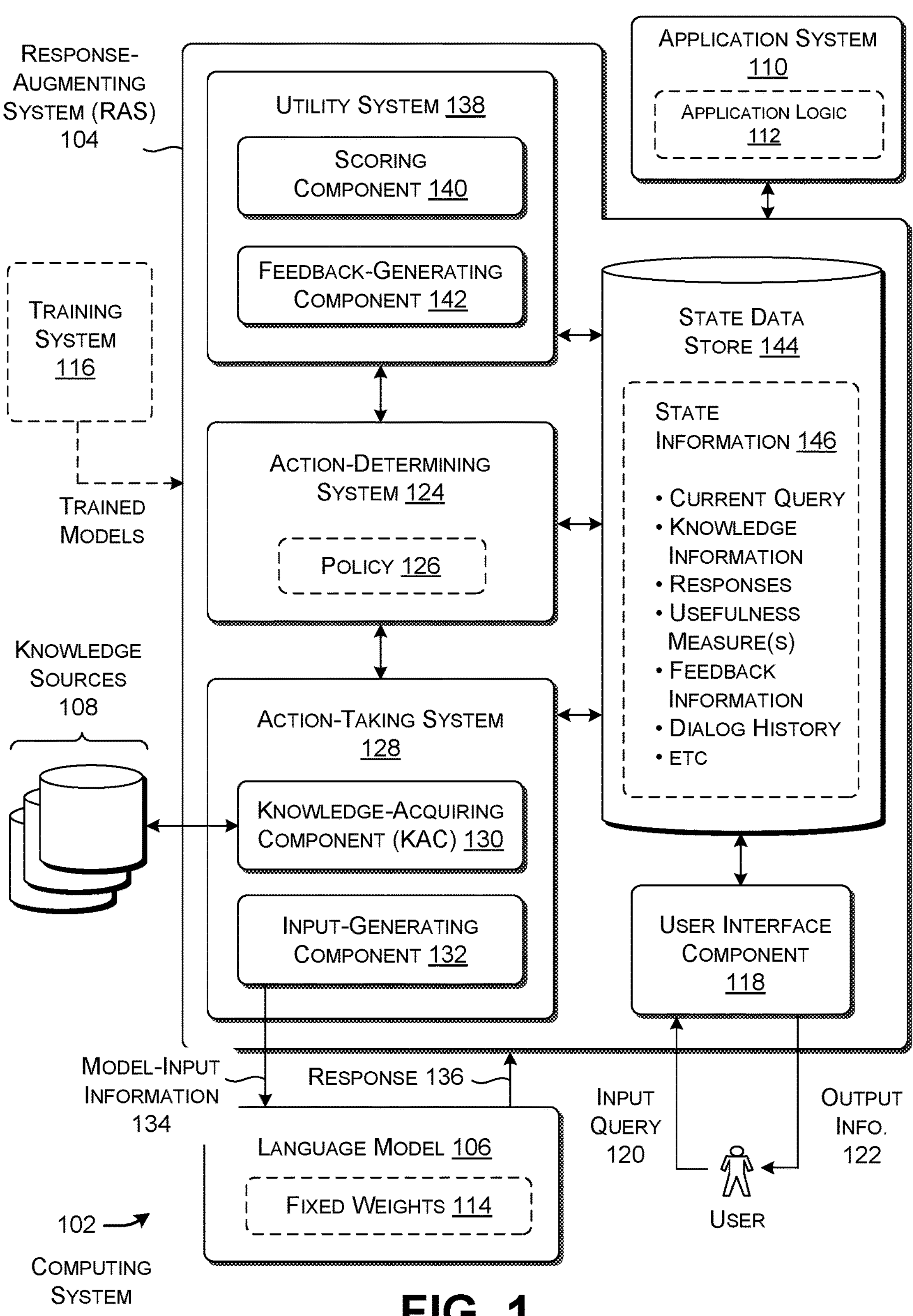
FIG. 1 shows a computing system that includes a response-augmenting system that interacts with a language model.

This section provides an overview of a computing system 102 shown in FIG. 1. The computing system 102 includes a response-augmenting system (RAS) 104 and a language model 106. The RAS 104 mediates a user's (or other entity's) interaction with the language model 106. Sections B-D provide additional illustrative details regarding individual components of the RAS 104.

Figure 14:
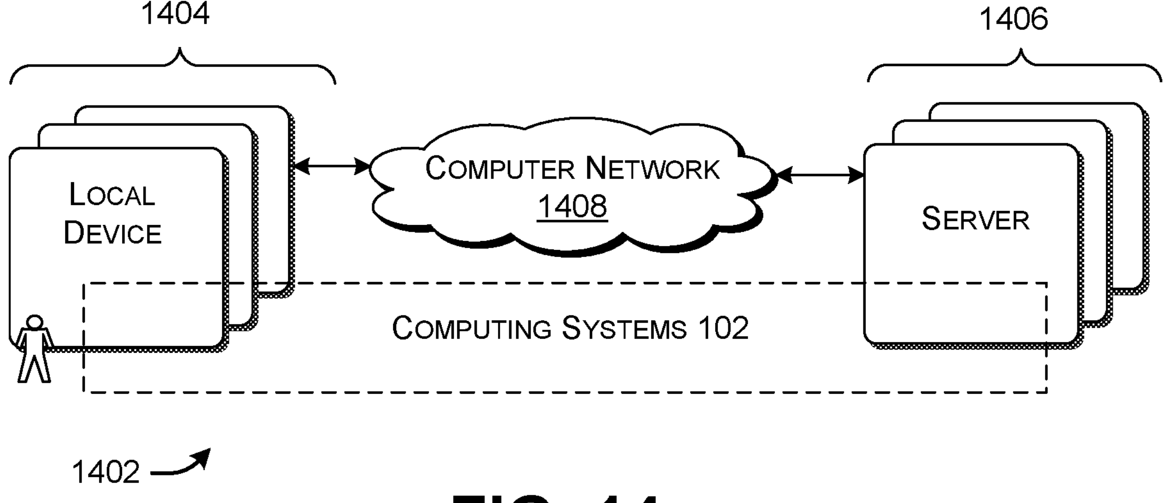
FIG. 14 shows computing equipment that, in some implementations, is used to implement the computing system of FIG. 1.
Figure 15:
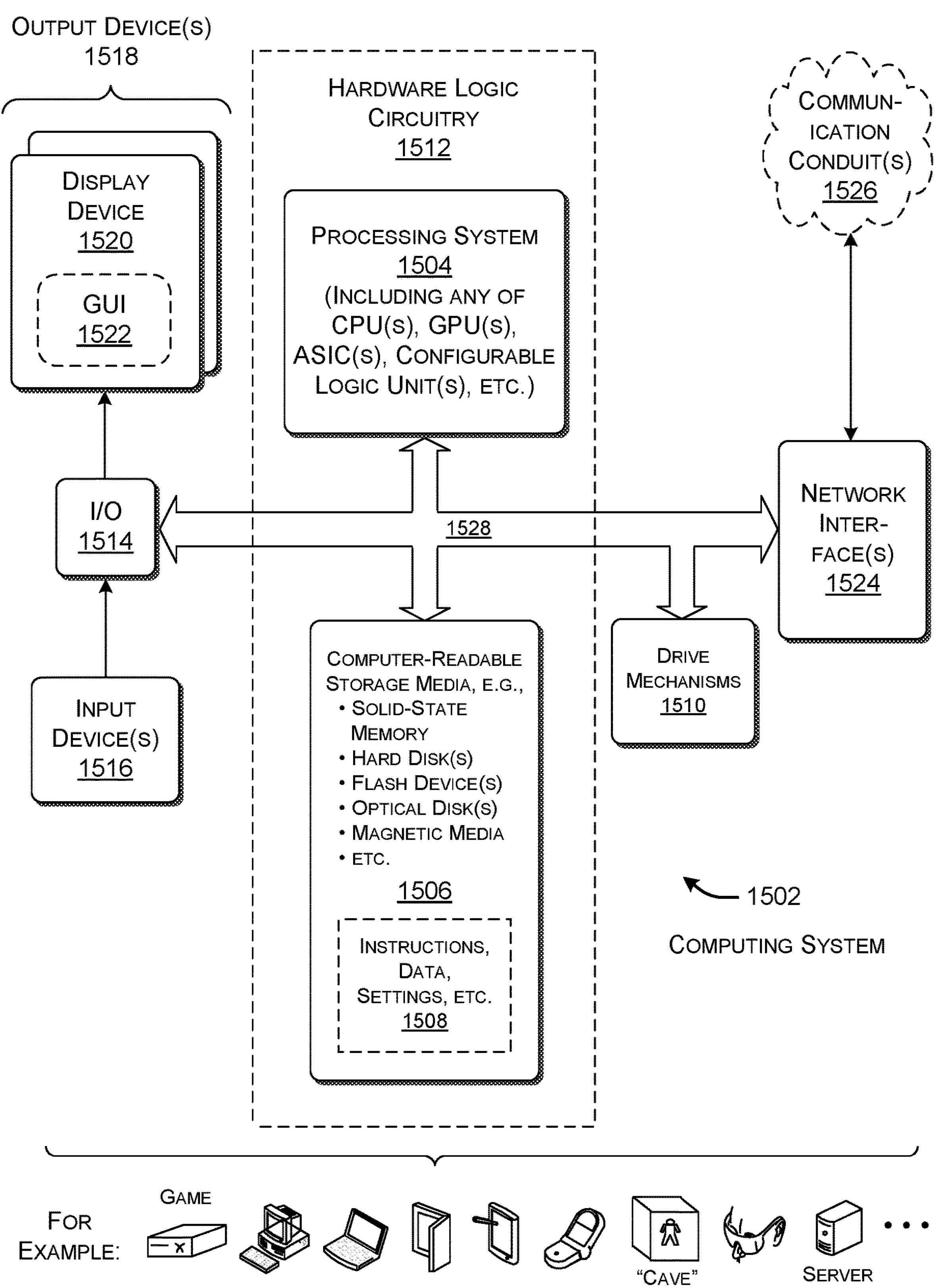
FIG. 15 shows an illustrative type of computing system that, in some implementations, is used to implement any aspect of the features shown in the foregoing drawings.

By way of terminology, as used herein, a "machine-trained model" refers to computer-implemented logic for executing a task using machine-trained weights that are produced in a training operation. A "weight" refers to any type of parameter value that is iteratively produced by the training operation. In some contexts, terms such as "component," "module," "engine," and "tool" refer to parts of computer-based technology that perform respective functions. FIGS. 14 and 15, described below, provide examples of illustrative computing equipment for performing these functions.

The RAS 104 mediates interaction with the language model 106 by generating model-input information based on external knowledge information obtained from one or more knowledge sources 108. The RAS 104 then provides the model-input information to the language model 106, prompting the language model 106 to provide a response. The RAS 104 then assesses the usefulness of the response using one or more usefulness measures. Upon determining that the language model's response fails to satisfy a prescribed test, the RAS 104 generates revised model-input information that includes feedback information, and provides the revised model-input information to the language model 106. The feedback information serves the goal of directing the language model 106 to produce a more useful response.

An application system 110 uses the RAS 104 in the course of providing an overarching service. For example, one kind of application system performs a reservation function with the assistance of the RAS 104. Another kind of application performs a question-answering function with the assistance of the RAS 104, and so on. FIG. 1 generally shows that the application system 110 includes application logic 112 for performing its native functions. For example, a reservation system includes a program for checking availability of an item (including a vehicle, an airline flight, a hotel room, etc.), a program for interacting with a user using the RAS 104, a program for processing a user's payment, and so on.

In some implementations, the computing system 102 relies on an "off-the-shelf" language model 106 having given fixed weights 114, produced by others using a pre-training operation. A publicly-available transformer-based model for performing pattern completion is the BLOOM model available from HUGGING FACE, INC., of New York, New York, one version of which is Version 1.3 released on Jul. 6, 2022.

In some implementations, a pre-training system (not shown) trains the language model 106 with respect to one or more generic language-model tasks, unrelated to specific functions performed by the RAS 104. (Note that the developer typically receives the language model 106 after the pre-training has been performed by others.) In a first language-modeling task, for example, the pre-training system randomly masks tokens in a sequence of input tokens fed to the language model 106. The pre-training system assesses an extent to which the language model 106 can successfully predict the identities of the masked tokens, and updates the weights 114 of the language model 106 accordingly. In a second language-modeling task, the pre-training system feeds two concatenated sentences to the language model 106. The pre-training system then measures an extent to which the language model 106 can successfully predict whether the second sentence properly follows the first sentence (with reference to ground-truth information that indicates whether the second sentence properly follows the first sentence), and then updates the weights of the language model accordingly. Background on the general task of pre-training language models is provided in Devlin, et al., "BERT: Pre-training of Deep Bidirectional Transformers for Language Understanding," arXiv, Cornell University, arXiv: 1810.04805v2 [cs.CL], May 24, 2019, 16 pages.

Once trained, the language model 106 operates as a pattern-completion engine. That is, the language model 106 autoregressively predicts the tokens that are most likely to follow an initial set of tokens. The language model 106 performs this function based on its ability to capture the statistical patterns exhibited by the training examples processed in the pre-training operation. Background information on the general topic of auto-regression in language models can be found at Brown, et al., "Language Models are Few-Shot Learners," arXiv, Cornell University, arXiv: 2005.14165v4 [cs.CL], Jul. 22, 2020, 75 pages.

More specifically, the language model 106 performs auto-regression in the following manner. Assume that an agent feeds an initial sequence of text tokens ( . . . $T_{N-3}$, $T_{N-2}$, $T_{N-1}$, $T_N$) to the language model 106, with $T_N$ being a last submitted text token. (A text token refers to any unit of alphanumeric text, such as a complete word or a fragment of a word.) The language model 106 maps the model-input information into output information that identifies a next text token ($T_{N+1}$) that is likely to follow the sequence of text tokens. The agent appends the generated token ($T_{N+1}$) to the end of the previous sequence of tokens, and then feeds the updated model-input information ( . . . $T_{N-3}$, $T_{N-2}$, $T_{N-1}$, $T_N$, $T_{N+1}$) to the language model. The agent continues this autoregressive process until the language model 106 generates a stop token. The agent interprets the stop token as an instruction to stop generating tokens in the above-described manner. At the beginning of the auto-regression operation, the agent typically feeds a set of initial tokens to the language model 106, common referred to as a prompt.

In some implementations, the language model 106 incorporates attention-based logic. Attention-based logic is functionality that assesses the relevance of each part of input information fed to the attention-based logic with respect to the interpretation of each other part of the input information. More specifically, in some implementations, the language model 106 is implemented as a series of transformer blocks. Further details regarding this type of model are set forth below in Section E, in connection with FIG. 11. Other implementations of the language model 106 use other types of machine-trained models, including fully-connected feed-forward neural networks (FFNs), convolutional neural networks (CNNs), recurrent neural networks (RNNs), and so on, or any combination thereof.

A training system 116 trains one or more other machine-trained models used by the RAS 104. Later sections will provide additional details regarding these other machine-trained models. At this juncture, note, however, that the weights 114 of the language model 106 are fixed. This means that the training system 116 need not fine-tune the weights 114 of the language model 106 itself when it trains the other machine-trained models.

Now referring to the RAS 104 itself, a user interface component 118 provides an interface by which a user or other entity interacts with the RAS 104. In some cases, for example, the user interface component 118 receives an input query 120 from a user. The input query 120 includes one or more words that convey a question or other information to which the language model 106 is asked to respond. The user interface component 118 receives the input query in any input form, such as a text-based form, a voice-based form, etc. If received in a voice-based form, the user interface component 118 uses a speech-recognition system (not shown) to convert the input query to text-based form.

The RAS 104 generates output information 122 in response to the input query 120. In part, the output information 122 expresses or otherwise depends on a final response provided by the language model 106. The user interface component 118 delivers the output information 122 to the user in any form, such as a text-based form, a voice-based form, and so on.

An action-determining system 124 determines which action should be taken by the RAS 104 at any given time. In some implementations, the action-determining system 124 specifically functions as a state machine, governed by a policy 126. The policy 126 describes one way of mapping different instances of state information to different respective actions. An instance of state information, in turn, describes a current state of a dialogue being conducted with the language model 106 at a particular time. Note that the current state of a dialogue may incorporate contextual information regarding prior turns of the dialogue, as part thereof.

An action-taking system 128 includes different components that perform different actions selected by the action-determining system 124. For instance, a knowledge-acquiring component (KAC) 130 performs a knowledge-acquiring action. This action involves extracting initial knowledge information from the knowledge sources 108. In some cases, the KAC 130 processes the initial knowledge information to produce final knowledge information, e.g., by identifying and validating one or more chains of evidence in the initial knowledge information. Section C provides further information regarding one implementation of the KAC 130.

The knowledge sources 108 include data stores distributed over one or more locations. One such source corresponds to a repository of encyclopedia-type and/or dictionary-type information items (e.g., Wikipedia articles). Another such resource corresponds to a repository of customer reviews. Another source corresponds to a repository of blog posts that include links to web pages. Another source contains documents pertaining to a particular subject, such as a particular health-related subject, and so on. Generally, different application systems involve the use of knowledge associated with different knowledge domains; hence, different application systems involve interaction with different repositories of knowledge. In some implementations, the KAC 130 interacts with the knowledge sources via one or more application programming interfaces (APIs).

An input-generating component 132 produces an instance of model-input information 134, and forwards the model-input information 134 to the language model 106. The model-input information 134 describes various aspects of the current state information. For instance, in a first pass, the model-input information 134 includes at least introductory prompt information, an expression of the input query 120, and the knowledge information provided by the KAC 130, all of which are concatenated together in a series of text tokens. The introductory prompt information informs the language model 106 how it is expected to respond to the model-input information 134. The language model 106 responds to the model-input information by generating a response 136.

A utility system 138 evaluates the response 136 generated by the language model 106. More specifically, a scoring component 140 generates at least one usefulness measure that describes an extent to which the response 136 is useful. Different application systems define the attributes of a useful response. In one illustrative case, for example, the scoring component 140 produces a usefulness measure that depends on a degree of overlap between the knowledge information provided by the KAC 130 and the response 136 provided by the language model 106. A high degree of overlap is preferred. The utility system 138 also determines whether the usefulness measure satisfies a prescribed test. In some instances, the utility system 138 perform this function by assessing whether the usefulness measure satisfies an environment-specific threshold value and/or other criterion. The user interface component 118 forwards the response 136 generated by the language model 106 to the user for the case in which the usefulness measure is determined to satisfy the prescribed test.

A feedback-generating component 142 generates feedback information when it is determined that the usefulness measure does not satisfy the prescribed test. The RAS 104 then instructs the input-generating component 132 to generate revised model-input information, and to send the revised model-input information to the language model 106. The revised model-input information includes the feedback information produced by the feedback-generating component 142.

In general, the feedback information is a textual prompt that informs the language model 106 how it is to interpret the instance of revised model-input information. In some cases, the feedback-generating component 142 produces the feedback information by retrieving a pre-generated instance of prompt information. In other examples, the feedback-generating component 142 uses a generative model of any type to map information describing the current state into the feedback information. In other words, in this case, the feedback-generating component 142 synthesizes the feedback information based on the current state, using any generative model (such as the language model 106 itself).

A state data store 144 stores state information 146. The state information 146 describes various aspects of a current state of a dialogue between the user and the language model 106, as mediated by the RAS 104. For example, the state information 146 includes any of: a) a current input query 120; b) current knowledge information produced by the KAC 130; c) a current response (or responses) generated by the language model 106 in response to the current input query 120; d) any usefulness measures generated by the scoring component 140 for the current response; e) a current instance of feedback information generated for the current response; and f) dialogue history information regarding any previous turn (or turns) of the dialogue and/or other context-based factors. That is, the dialogue history encompasses any prior input queries submitted in the dialogue, prior instances of knowledge information provided in the dialogue, prior language model responses provided in the dialogue, and so on.

Figure 2:
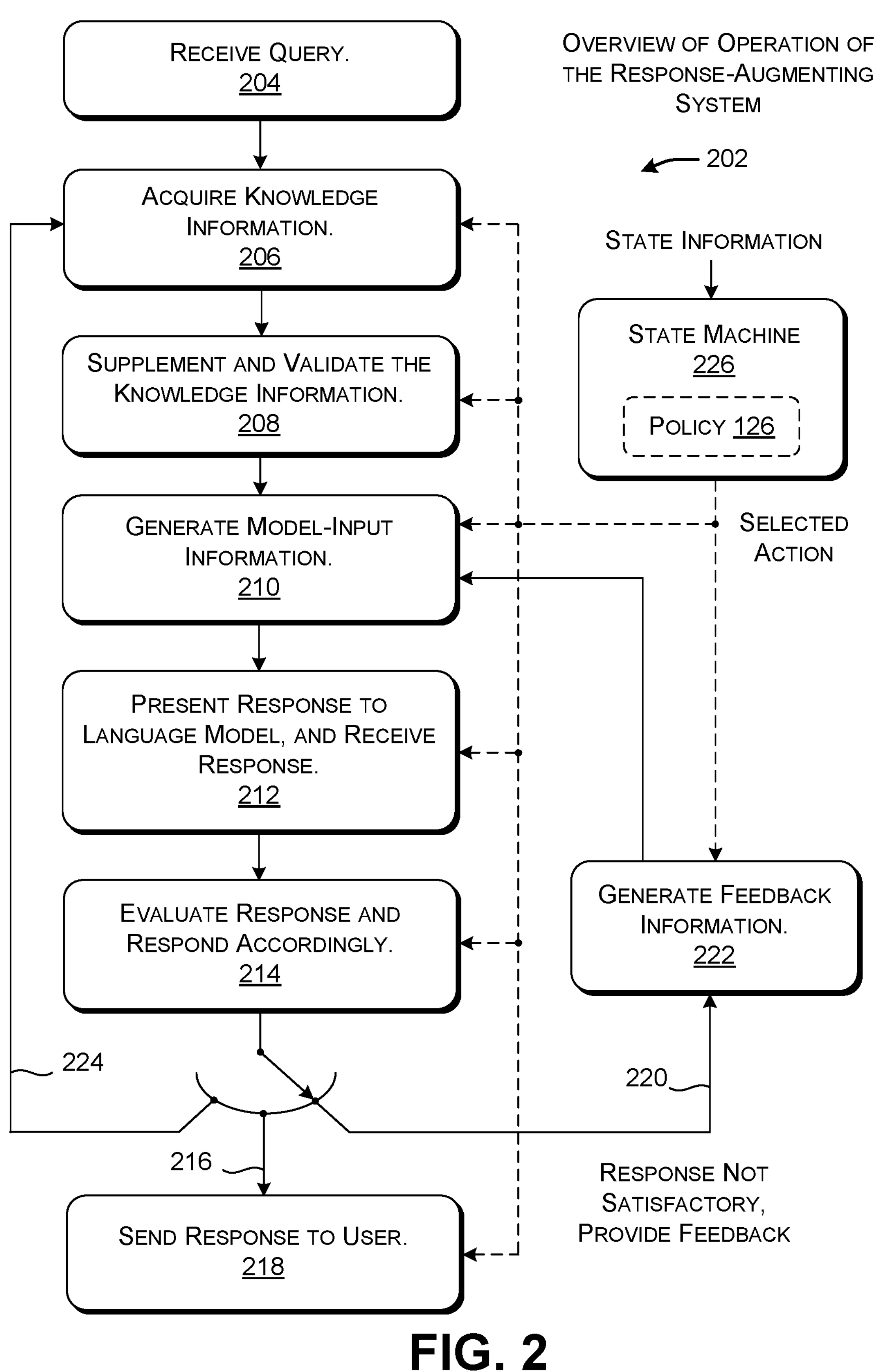
FIG. 2 shows an overview of one manner of operation of the response-augmenting system of FIG. 1.

FIG. 2 shows an overview 202 of the operation of the RAS 104 of FIG. 1. In block 204, the user interface component 118 receives the input query 120. In block 206, the KAC 130 retrieves initial knowledge information from the knowledge sources 108 based on the input query 120. In block 208, the KAC 130 optionally bolsters the initial knowledge information, to produce final knowledge information. For instance, the final knowledge information includes at least one validated chain of evidence. In block 210, the input-generating component 132 produces original model-input information 134 based on at least the input query 120 and the knowledge information. In block 212, the input-generating component 132 presents the original model-input information 134 to the language model 106, which prompts the language model 106 to generate an original response 136. As part of block 212, the RAS 104 then receives the original response 136 generated by the language model 106.

In block 214, the utility system 138 uses the scoring component 140 to generate at least one usefulness measure that reflects an assessed degree of usefulness of the original response 136. The utility system 138 also determines whether this usefulness measure satisfies the prescribed test. If the test is satisfied, per path 216 and block 218, the user interface component 118 sends the original response 136 to the user (via output information 122).

Alternatively, assume that the usefulness measure does not satisfy the prescribed test. If so, per path 220 and block 222, the feedback-generating component 142 generates feedback information. The flow of FIG. 2 then returns to block 210, whereupon the input-generating component 132 produces revised model-input input information that includes the feedback information, and sends the revised model-input information to the language model 106. Alternatively, per path 224, the flow of FIG. 2 returns to block 206, whereupon the KAC 130 collects additional knowledge information pertaining the user's input query 120. More generally, the specific set of actions shown in FIG. 2 is an example of one implementation of the RAS 104; different implementations of the action-determining system 124 choose from among different sets of actions.

In an alternative manner of operation, the RAS 104 uses the user interface component 118 to inform the user whenever a response generated by the language model 106 is deemed deficient based on analysis performed by the utility system 138. The RAS 104 further asks the user whether he or she would like the RAS 104 to prompt the language model 106 to generate another response based on feedback information generated by the feedback-generating component 142. The user may decide to forgo this operation because the user considers the response that is already provided to be sufficient, and/or the user does not wish to wait for the RAS 104 and the language model 106 to produce another response.

In another possible variation, the user interface component 118 allows the user to manually input feedback information upon receiving a response that the user deems unacceptable. The input-generating component 132 adds this manually-specified feedback information to the instance of revised model-input information. In some implementations, the utility system 138 also modifies its machine-trained model and/or rules-based model based on the manually-specified feedback information.

As mentioned above, in some implementations, the action-taking system 128 functions as a state machine 226. The state machine 226 maps current state information to an indication of which action should be invoked next. Illustrative actions correspond to the individual blocks shown in FIG. 2.

In some cases, the state machine 226 specifically models the interaction between the user and the language model 106 as a Markov Decision Process (MDP) described by a five-tuple ($\mathcal{S}$, $\mathcal{A}$, $\mathcal{P}$, R, γ). $\mathcal{S}$ represents an infinite set of dialogue states, which encode information stored in the state data store 144, described above. $\mathcal{A}$ is a set of actions that the action-determining system 124 chooses among, as governed by the policy 126. In some implementations, the actions include at least: 1) calling the KAC 130; 2) calling the input-generating component 132 to generate a new instance of model-input information; and 3) sending the response provided by the language model 106 to the user. $\mathcal{P}(s'|s, a)$ gives a transition probability of entering a new state s' after action a is taken in state s. R(s,a) is an external reward received after taking an action a in state s. The reward R is provided by the environment. $\gamma \in (0,1)$ is a discount factor.

Figure 3:
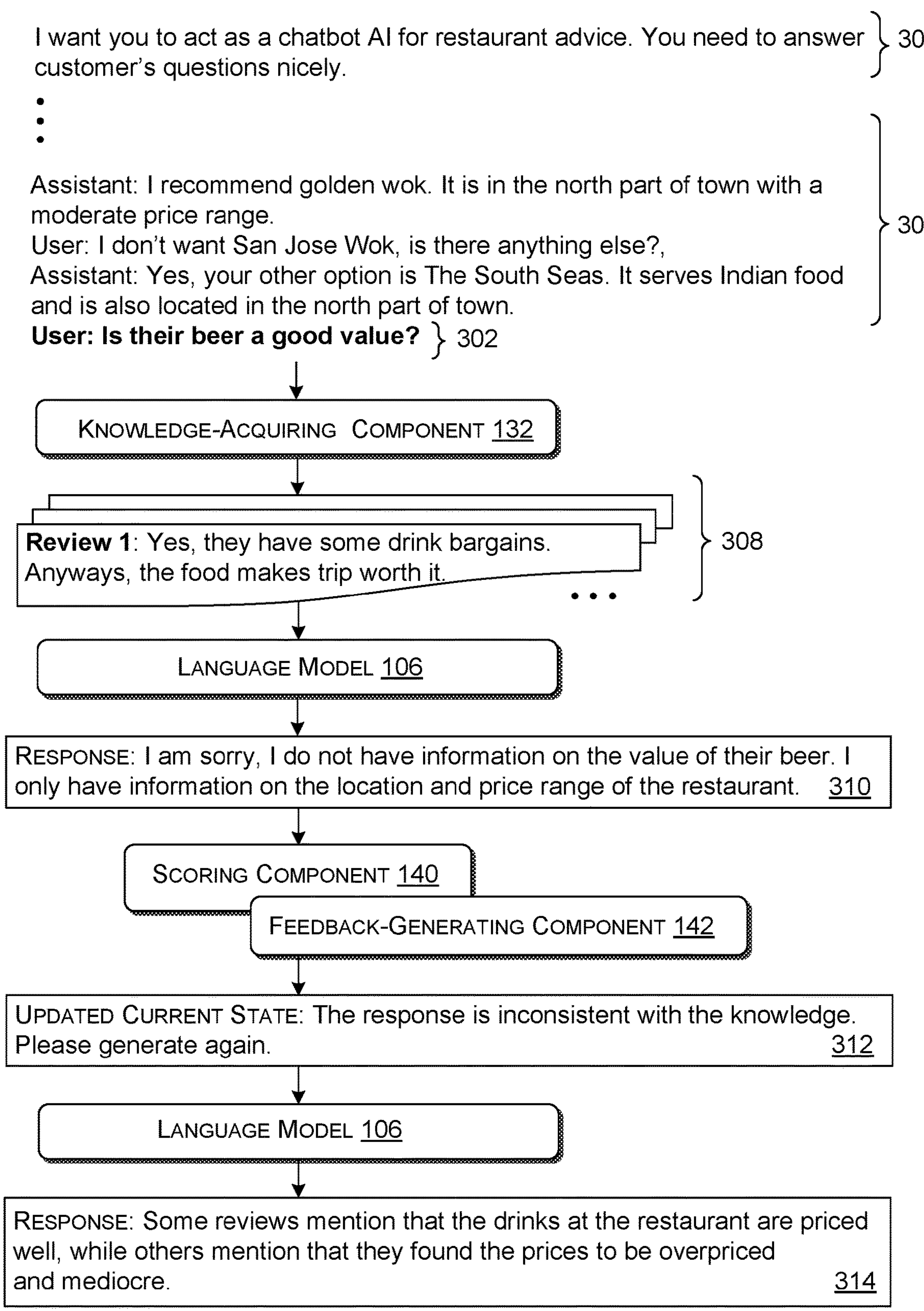
FIG. 3 shows a first example of the operation of the response-augmenting system of FIG. 1.

FIG. 3 shows a first example of the operation of the RAS 104 of FIG. 1. Assume that, at a particular stage in a dialogue, a user enters the input query 302: "Is their beer a good value?" Assume that this input query 302 follows prior turns 304 of the dialogue (only some of which are shown in FIG. 3), in which the user and the language model 106 "converse" about restaurants on the north side of the city of San Jose, California. More specifically, in the prior turns 304, assume that the language model 106 first identifies a restaurant named "San Jose Wok." The user then asks for another suggestion, upon which the language model 106 identifies a restaurant named "The South Seas." In the current input query 302, the user asks whether the price of beer at The South Seas restaurant is a good value. Finally, assume that the input-generating component 132 prepends prompt information 306 to the first instance of model-input information that it provides to the language model 106. The prompt information 306 informs the language model 106 how it is expected to respond to the user's queries.

In response to the input query 302, the KAC 130 acquires knowledge information. In this case, assume that the knowledge information takes the form of plural review items extracted from a repository of restaurant reviews. The input-generating component 132 generates model-input information that expresses at least the user's input query 120 and the knowledge information 308. In some implementations, the model-input information also expresses the prior dialogue information and the prompt information 306.

Assume that the language model 106 responds to the model-input information by generating the response 310: "I am sorry. I do not have information on the value of their beer. I only have information on the location and price range of the restaurant." The scoring component 140 generates a usefulness measure based on this response. Assume that the scoring component 140 performs this function by comparing the knowledge information 308 (e.g., the text of the reviews) with the text of the response 310, e.g., to determine an extent to which the response 310 embodies the text tokens included in the knowledge information 308. In the present case, at least some of the reviews include commentary regarding the prices of beverages at this particular restaurant. The response 310, however, does not reflect the available knowledge and is therefore of poor quality. In some implementations, the utility system 138 formally reaches this conclusion by determining that the usefulness measure fails to satisfy an environment-specific threshold value.

The feedback-generating component 142 responds to above conclusion by generating an instance of feedback information 312 that reads: "The response is inconsistent with the knowledge. Please generate again." In some implementations, the feedback-generating component 142 retrieves this feedback information 312 from a pre-generated store of instances of feedback information. In other implementations, the feedback-generating component 142 uses a generative model to synthesize the feedback information 312 based on the current state information.

Next, the input-generating component 132 produces a revised instance of model-input information that includes the feedback information 312, and feeds the revised instance of model-input information to the language model 106. Assume that the language model 106 responds to the revised model-input information by generating the revised response 314: "Some reviews mention that the drinks at the restaurant are priced well, while others mention that they found the prices to be overpriced and mediocre." Assume that the utility system 138 now judges the response 314 to be suitably consistent with the knowledge information. Hence, the RAS 104 now instructs the user interface component 118 to deliver the response 314 to the user.

Figure 4:
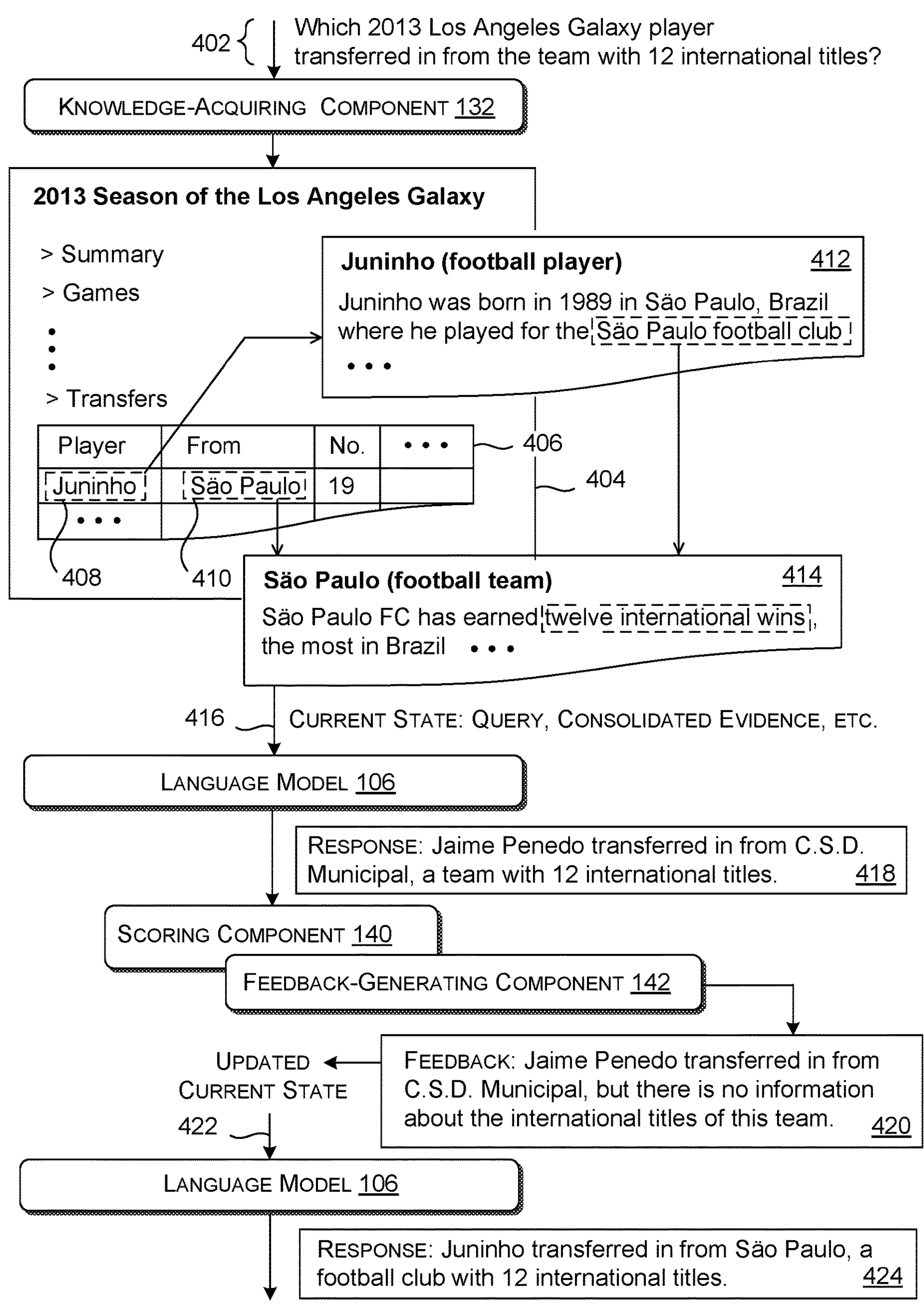
FIG. 4 shows a second example of the operation of the response-augmenting system of FIG. 1.

FIG. 4 shows a second example of the operation of the RAS of FIG. 1. Assume that the user begins a dialogue by entering the input query 402: "Which 2013 Los Angeles Galaxy player transferred in from the team with 12 international titles?" This input query 402 requires the language model 106 to identify a team that has won 12 international titles. The input query 402 also requires the language model 106 to identify the player on this team who transferred into the team Los Angeles Galaxy in the year 2013. The language model 106 may not be able to answer this kind of input query 402 without the assistance of the RAS 104, as it requires a degree of knowledge synthesis that goes beyond the statistical patterns embodied in the language model's weights.

Assume that the KAC 130 identifies one or more first-hop information items that match the input query 402. The term "first-hop" indicates that the information items are directly identified based on the input query 402, e.g., in response to conducting a search in a data store of information items that match the input query 402. Assume that a particular information item 404 corresponds to a Wikipedia entry associated with the 2013 season of the soccer team with the name "Los Angeles Galaxy." Further assume that the information item 404 includes a table 406 that identifies the players who transferred into this soccer team for the 2013 season.

In some implementations, the KAC 130 operates by identifying entity mentions in the information item 404. Assume that some entity mentions appear within the table 406, including the player name "Juninho" (corresponding to a first entity mention 408), and the team name "Sao Paulo" (corresponding to a second entity mention 410). In some implementations, the KAC 130 next identifies an information item 412 that provides further information regarding the player "Juninho," and an information item 414 that provides further information regarding the team "Sao Paulo." In some examples, these information items (412, 414) correspond to respective Wikipedia entries pertaining to the entity mentions (408, 410) of Juninho and Sao Paulo, respectively. The information items (412, 414) are second-hop information items because they are accessible upon performing two "hops," triggered by the submission of the input query 402.

At this stage, the KAC 130 has identified at least three candidate chains of evidence. The first chain of evidence links the input query 402 to the first-hop table 406. The second chain of evidence links the input query 402 to the second-hop information item 412 via the first entity mention 408 ("Juninho"). The third chain of evidence links the input query 402 to the second-hop information item 414 via the second entity mention 410 ("São Paulo"). There may be many more such chains evidence not show in FIG. 4. In some implementations, the KAC 130 ranks the chains of evidence with respect to their relevance to the input query 402. Section B provides further information regarding one way in which the KAC 130 performs this function. At this stage, assume that the KAC 130 identifies all three of the above-described chains of evidence as being relevant to the input query 402.

In a next stage, the input-generating component 132 produces an instance of model-input information 416 that includes at least the input query 120 and the knowledge information produced by the KAC 130. Assume that the language model 106 responds to the model-input information 416 by generating the response 418: "Jaime Penedo transferred in from C.S.D Municipal, a team with 12 international titles."

Note that second chain of evidence described above establishes that the team Sao Paulo has 12 international titles, not the team C.S.D. Municipal. Accordingly, the the utility system 138 concludes that the response 418 is inconsistent with the collected evidence and is therefore unsatisfactory. In response to this finding, the feedback-generating component 142 generates the feedback information 420: "Jaime Penedo transferred in from C.S.D. Municipal, but there is no information about the international titles of this team." In some implementations, the feedback-generating component 142 uses a generative model to produce this feedback information 420 based on the current state information. The current state information includes at least the input query 402, the knowledge information (including the validated chains of reasons), and the first response 418 and its associated usefulness measure.

The input-generating component 132 next generates revised model-input information 422 that incorporates the feedback information 420. Assume that the language model 106 responds to the revised model-input information 422 by generating the response 424: "Juniho transferred in from Sao Paulo, a football club with 12 international titles." Assume that the utility system 138 determines that this response 424 now passes its prescribed test. In response, the RAS 104 instructs the user interface component 118 to deliver the response 424 to the user.

Figure 5:
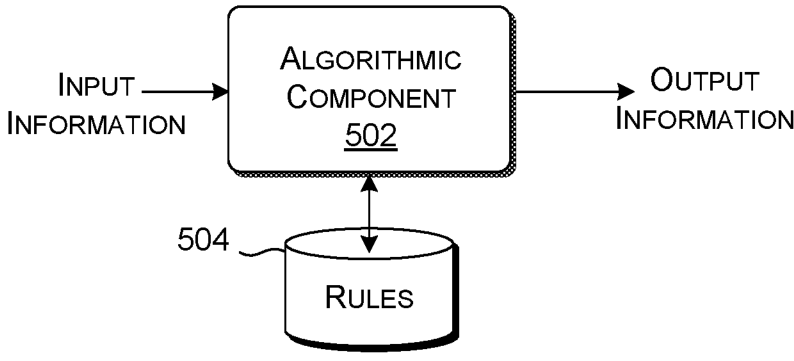
FIG. 5 shows rules-based logic for implementing the response-augmenting system of FIG. 1.
Figure 6:
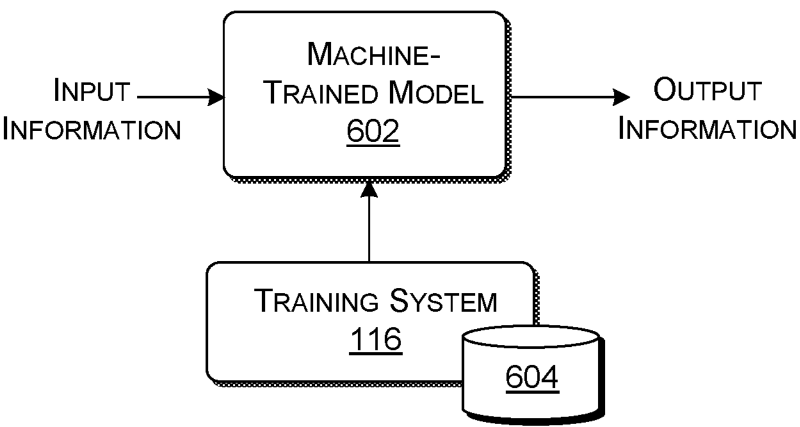
FIG. 6 shows machine-trained logic for implementing the response-augmenting system of FIG. 1.

With reference to FIGS. 5 and 6, the RAS 104 relies on any type of functionality, or any combinations of different types of functionality, to implement the functions described above. For instance, FIG. 5 shows an example in which an algorithmic component 502 uses one or more rules provided in a data store 504 to map input information to output information. The rules can be expressed as discrete IF-THEN type rules and/or any other type(s) of rules. Alternatively, or in addition, the rules can be expressed as an algorithm, e.g., as a program that performs a subroutine. FIG. 6 shows an example in which a machine-trained model 602 maps input information to output information. The machine-trained model 602 includes weights produced by the training system 116 in a preliminary training operation. For instance, the training system 116 iteratively processes a collection of training examples in a data store 604, e.g., using stochastic gradient descent in combination with back-propagation.

In conclusion to this introductory section, the RAS 104 improves the quality of responses generated by the language model 106. The RAS 104 specifically eliminates or reduces artificial hallucination exhibited by the language model 106. This characteristic fosters efficient dialogues between users and the language model 106. That is, by improving the quality of responses, the RAS enables a user to efficiently achieve the objective of a dialogue. Further, by efficiently advancing to the objective with a reduced number of dialogue turns, over time, the RAS 104 reduces the consumption of resources, such as processor resources and memory resources.

Further, the application system 110 can reduce the error rate of its application functions by using the RAS 104 to mediate interaction with the language model 106, instead of directly interacting with the language model 106. This aspect is of heightened importance for applications that rely on the language model 106 to perform system-critical tasks.

Further, the training system 116 does not involve the resource-intensive and time-intensive task of fine-tuning the weights 114 of the language model 106. That is, the weights 114 of the language model 106 remain fixed. This characteristic also provides a scalable solution to the problem of artificial hallucination, insofar as a developer need not repeatedly update the language model 106 to incorporate new knowledge.

B. Illustrative Action-Determining System

The action-determining system 124 generally chooses among a set of possible actions based on the current state information. In some implementations, the action-determining system 124 performs this function using rules explicitly created by a developer or other entity. For instance, one rule instructs the KAC 130 to retrieve information from the knowledge sources 108 if the user's input query 120 contains an entity mention pertaining to a product. The set of rules collectively defines the policy 126 of the action-taking system 128.

Figure 7:
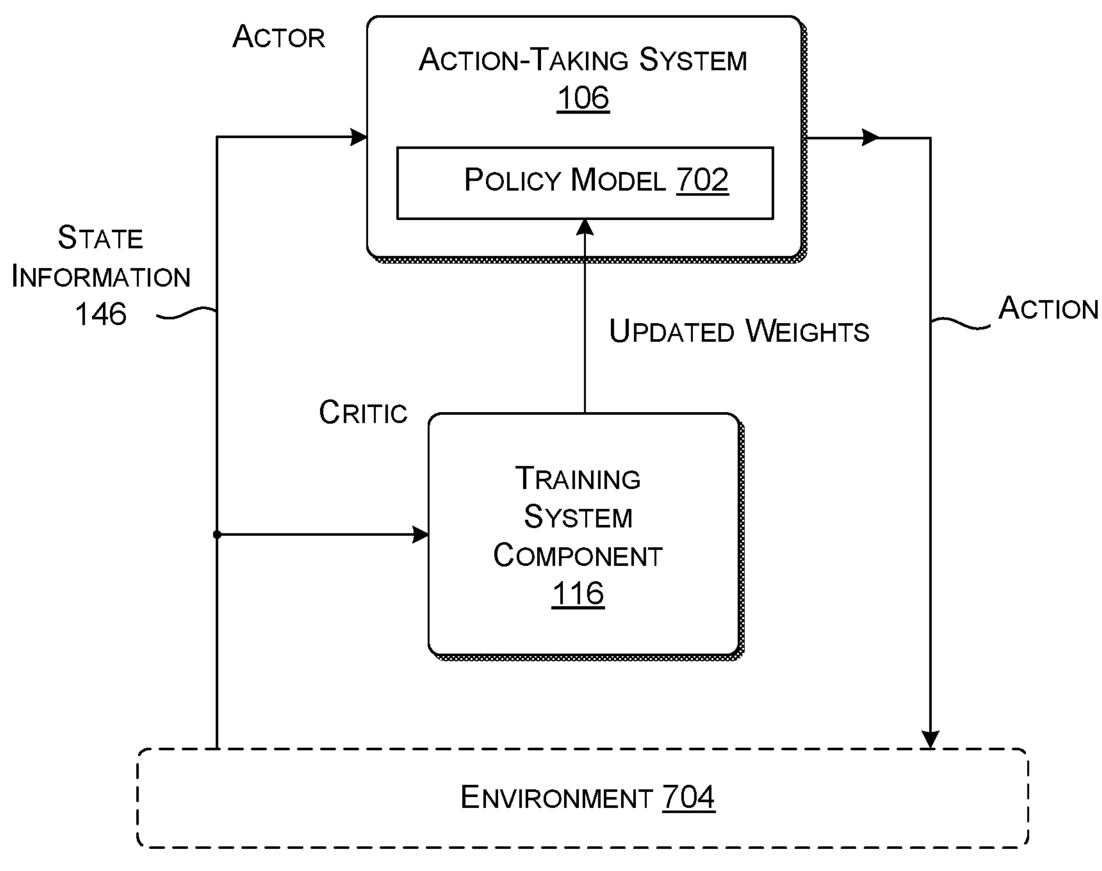
FIG. 7 shows one implementation of an action-determining system, which is one component of the response-augmenting system of FIG. 1.

Alternatively, or in addition, the action-determining system 124 implements the policy 126 using a machine-trained policy model. For example, FIG. 7 shows a case in which the action-taking system 128 maps the state information 146 to an action using a policy model 702. The training system 116 trains the policy model 702 using reinforcement learning, per the following equation:

$$\underset{\theta}{\operatorname{argmax}}\ \mathbb{E}_{s\sim S, a\sim\pi_\theta}[R(s, a)]. \tag{1}$$

That is, pursuant to this equation, the training system 116 iteratively adjusts the weights (θ) of the policy model ($\pi_\theta$) 702 to maximize a reward R(s,a) from an environment 704, in response to repeatedly taking actions. The action-taking system 128 specifically takes each action a starting from a state s. S is the set of possible states.

Different implementations of the training system 116 define what constitutes desirable model behavior in different respective ways. In some cases, the training system 116 attempts to maximize an extent to which each response generated by the language model 106 agrees with the knowledge provided by the KAC 130. To implement this objective, the training system 116 operates on the basis of a reward signal that measures a degree of overlap between each language model response and the knowledge information. Specific metrics that express the degree of overlap between two information items are described below in Section D. Alternatively, or in addition, the training system 116 attempts to reduce, on average, the number of turns in a dialogue that are used to provide a user with an acceptable response. Alternatively, or in addition, the training system 116 attempts to maximize the expeditious achievement of some application-specific result, such as the booking of a reservation.

In some implementations, the training system 116 implements training using the REINFORCE algorithm. Background information on the general topic of the REINFORCE algorithm can be found at Williams, Ronald J., "Simple statistical gradient-following algorithms for connectionist reinforcement learning," in Machine Learning, 8, May 1992, 27 pages, and Sutton, et al., "Reinforcement Learning: An Introduction," 2nd Edition, 2015, MIT Press, 352 pages.

Figure 8:
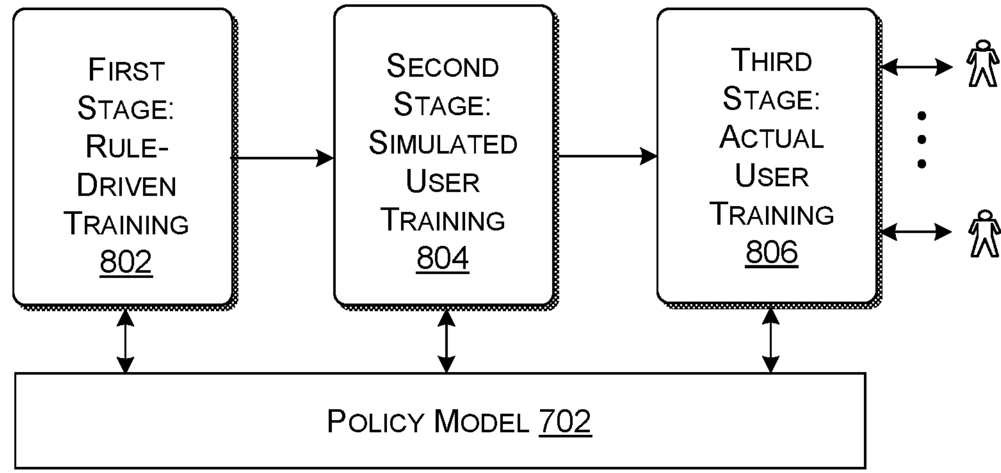
FIG. 8 shows a series of stages for training weights used by the action-determining system of FIG. 7.

FIG. 8 shows a staged manner by which the training system 116 trains the policy model 702 in some implementations. The training system 116 collects training examples in each stage, and updates the policy model 702 in a staged manner based on the training examples that are collected. Each training example describes an encountered state, an action taken in response to the state, an outcome of the action (e.g., indicating whether the action advances the objective of the policy model 702).

In a first bootstrapping stage 802, the action-determining system 124 chooses among actions using an explicit set of rules manually defined by a developer. One such rule instructs the KAC 130 to extract knowledge information whenever the user's input query 120 contains a product name. In a second stage 804, RAS 104 interacts with simulated users. A machine-trained language model simulates the users. Thus, the second stage involves two language models conversing with each other. In a third stage 806, the RAS 104 interacts with actual users.

C. Illustrative Knowledge-Acquiring Component

Figure 9:
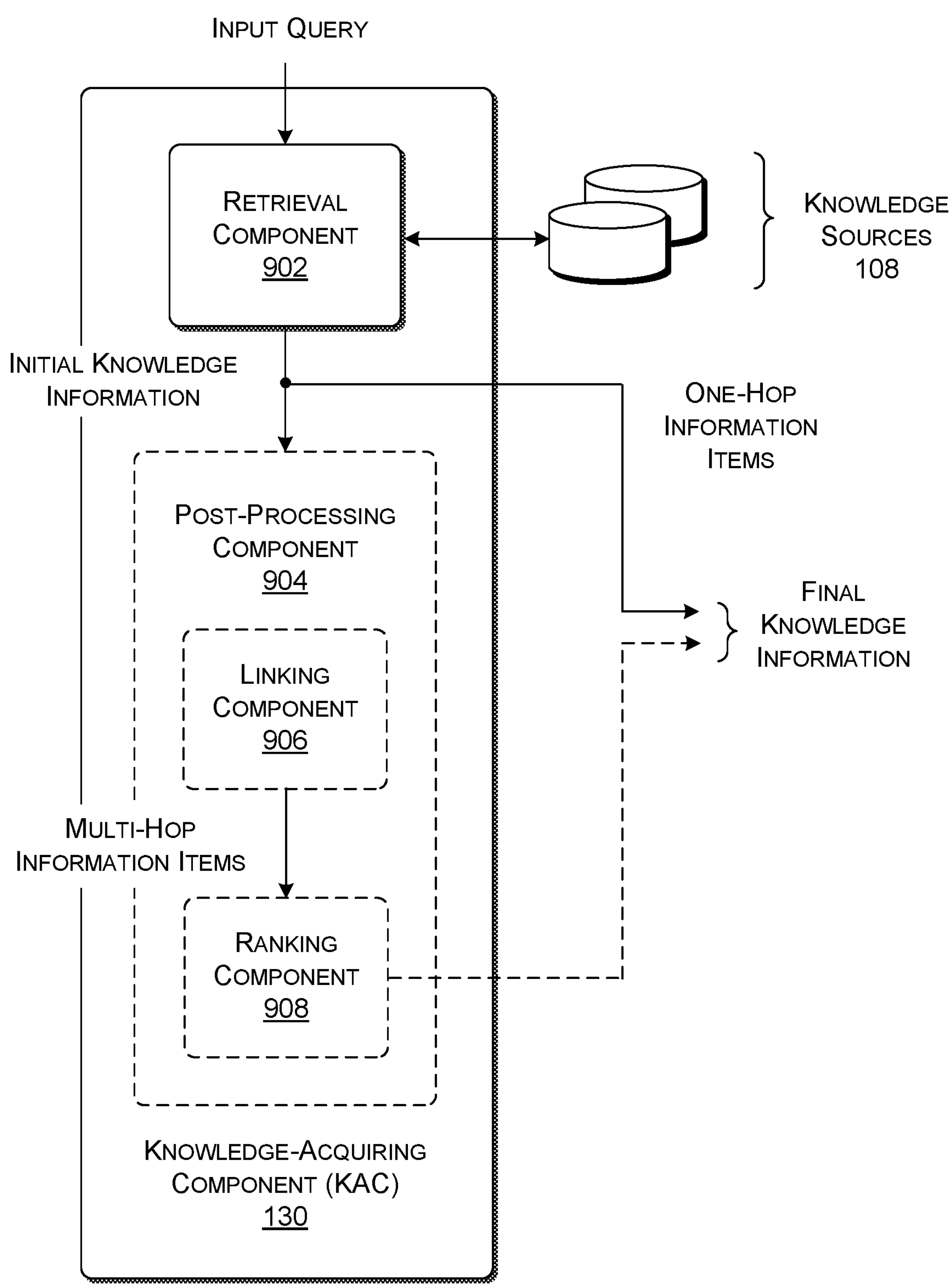
FIG. 9 shows one implementation of a knowledge-acquiring component, which is another component used by the response-augmenting system of FIG. 1.

FIG. 9 shows an overview of one implementation of the knowledge-acquiring component (KAC) 130. To repeat, the purpose of the KAC 130 is to generate knowledge information pertaining to the input query 120. The input-generating component 132 constructs the model-input information based, at least in part, on the knowledge information.

In a first stage, the KAC 130 uses a retrieval component 902 to obtain information items from any of the knowledge sources 108. As previously described, the knowledge sources 108 correspond to any local and/or network-accessible data stores. For example, at least some of the knowledge sources 108 correspond to repositories of information items accessible via the Internet using APIs. Illustrative information items include encyclopedia-type entries (e.g., available at the Wikipedia.org cite), dictionary-type entries, review-type entries, messages, blog posts, and so on.

The term "information item" generally encompasses any unit of information that includes any type of content, including any combination of text-bearing content, image-bearing content, audio-bearing content, video-bearing content, and so on. A "one-hop information item" is an information item that directly matches the input query 120, and is therefore accessible by performing a single retrieval operation. The information items identified by the retrieval component 902 constitute one-hop information items. Other information items are accessible by performing two or more retrieval operations, and therefore constitute N-hop information items, where N≥2.

The retrieval component 902 uses different retrieval techniques depending on the type of information item being searched and/or other environment-specific factors. For example, in some cases, the retrieval component 902 uses an explicit equation, algorithm, or rule to assess the relevance of the input query 120 to each candidate information item. Illustrative equation-based relevance measures include a term-frequency inverse-document-frequency (TF-IDF) score, a BM25 score, etc. Alternatively, or in addition, the retrieval component 902 uses a semantic vector-based approach to assess the relevance of the input query 120 to each candidate information item. That is, the retrieval component 902 uses a neural network of any type to map the input query 120 into a first vector in a vector space, and to map a candidate information item into a second vector in a vector space. The retrieval component 902 assesses the relevance of the input query 120 to the candidate information item by measuring the distance between the first vector and the second vector, such as by taking the dot product of the two vectors, computing cosine similarity between the two vectors, etc.

In some cases, the information items retrieved by the retrieval component 902 constitute the final knowledge information provided by the KAC 130. This is the case for the first example described with reference to FIG. 3. Alternatively, or in addition, the information items identified by the retrieval component 902 collectively constitute initial knowledge information. The KAC 130 further processes the initial knowledge information using a post-processing component 904, to produce final knowledge information. As a general objective, the post-processing component 904 expands and supplements the initial knowledge information, and validates the relevance of the identified information items to the original input query 120.

Some implementations achieve the above objectives using a linking component 906 in combination with a ranking component 908. The linking component 906 identifies links that connect the initial knowledge information to a set of one or more additional information items. For example, in the case of FIG. 4, the linking component 906 identifies entity mentions (408, 410) in the initial information item 404. Based thereon, the linking component 906 identifies at least two additional information items (412, 414) that pertain to these two entity mentions (408, 410), respectively. Each of the newly-identified information items (412, 414) constitutes a second-hop information item because it is identified in response to performing two search operations, triggering in response to the submission of the input query 120.

In some implementation, a first-hop information item is linked to a second-hop information item based on an actual hyperlink that links the first-hop information item to the second-hop information item. In other cases, an entity mention in a first-hop information item is not explicitly linked to a second-hop information item via a hyperlink; rather, the linking component 906 identifies the second-hop information item by performing any type of search within a knowledge store. For example, to identify the second information item 412 pertaining to the player name "Juninho" in the table 406, the linking component 906 identifies the Wikipedia entry that includes the player name "Juninho" in its title, or identifies the Wikipedia entry associated with the name "Juninho," as identified by Wikipedia index information.

Each path that connects an information item to the original input query 120 constitutes a chain of evidence. For example, a first chain of evidence connects the input query 402 to the initial information item 404. A second chain of evidence connects the input query 402 to the second-hop information item 412 via the entity mention 408 in the table 406. A third chain of evidence connects the input query 402 to the second-hop information item 414 via the entity mention 410 in the table, and so on. Although not shown, in some implementations, the linking component 906 continues the above-described linking analysis to identify three-hop information items, four-hop information items, and so on. In some cases, the linking component 906 continues a path through an information space until it reaches an environment-specific maximum number of hops (e.g., 3 hops). In addition, or alternatively, the linking component 906 expands a path through the information space providing that specified relevance conditions continue to be met. For example, the linking component 906 can continue a path until it encounters an information item that varies from the original input query 120 by a prescribed amount (e.g., as assessed using a vector-based comparison).

In some implementations, the linking component 906 uses any machine-trained entity classifier to detect entity mentions. For instance, one approach uses a Conditional Random Fields (CFR) entity classifier to identify entity mentions within a stream of text tokens. Another approach uses any type of neural network to identify entity mentions. For example, one approach uses a transformer-based encoder to map a sequence of text tokens into a corresponding sequence of hidden-state embeddings. A post-processing classifier neural network then maps the hidden-state embeddings to probability information. The probability information specifies whether the sequence of text tokens include an entity mention. In some cases, the probability information also specifies the type of entity mention provided in the sequence of text tokens. In some implementations, the post-processing classifier neural network includes a machine-trained linear neural network followed by a Softmax operation (e.g., a normalized exponential function).

The ranking component 908 ranks the relevance of each evidence chain with respect to the input query 120 and/or based on any other consideration. In some implementations, the ranking component 908 scores each evidence chain based on any characteristic(s) of the evidence chain. Illustrative characteristics include: 1) the relevance of a terminal information item of the evidence chain, with respect to the original input query 120; 2) a relevance of other information items in the evidence chain (besides the terminal information item), with respect to the original input query 120; 3) the strength of the links that connect neighboring information items along the evidence chain, and so on. In some implementations, the ranking component 908 identifies the strength between any two items using a vector-based similarity measure, described above. Other implementations can take into account other measures, e.g., by computing a cluster-based score that reflects a degree of semantic cohesion within the evidence chain as a whole.

Upon computing a score for each evidence chain in the above-described manner, the ranking component 908 selects N evidence chains have the most favorable (e.g., highest) scores (e.g., where, in some cases, N is 50). The KAC 130 treats this set of N evidence chains as the final knowledge information that is fed to the language model 106, along with other aspects of the state information 146.

Figure 10:
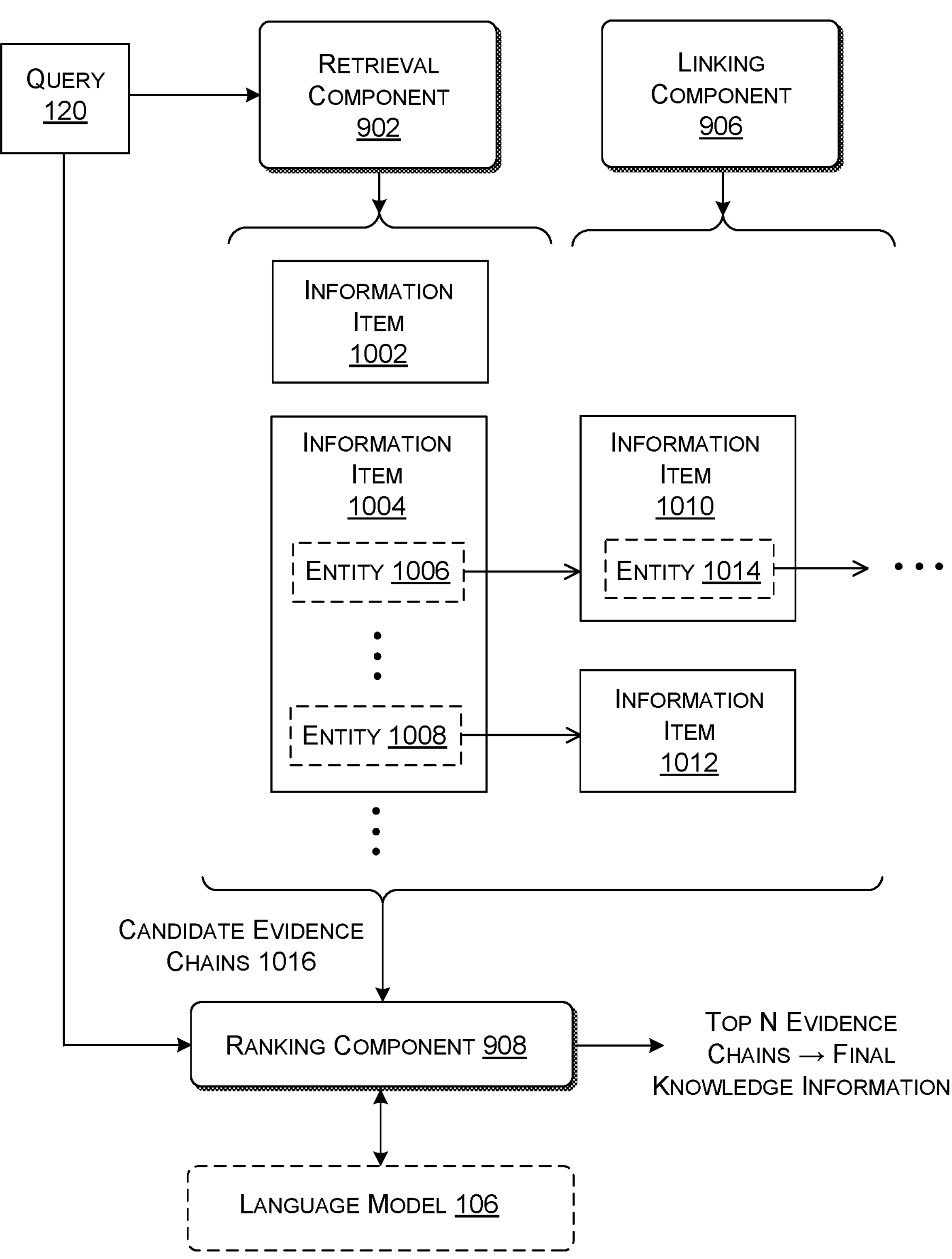
FIG. 10 shows additional details regarding the operation of the knowledge-acquiring component of FIG. 1.

FIG. 10 provides a summary of the above-described manner of operation of the KAC 130. Assume that the retrieval component 902 identifies at least two one-hop information items (1002, 1004) that match the input query 120. Assume that the linking component 906 next identifies at least two entity mentions (1006, 1008) in the second information item 1004. The linking component 906 identifies a second-hop information item 1010 that describes the first entity mention 1006, and another second-hop information item 1012 that describes the second entity mention 1008.

As further illustrated in FIG. 10, in some implementations, the linking component 906 extends its linking analysis by identifying third-hop information items, fourth-hop information items, and so on. For example, the linking component 906 identifies an entity mention 1014 in the second-hop information item 1010, and identifies a third-hop information item (not shown) that is linked to this entity mention 1014.

Altogether, the linking component 906 identifies a set 1016 of candidate evidence chains. A first evidence chain links the input query 120 to the first-hop information item 1002. A second evidence chain links the input query 120 to the second-hop information item 1010 via the entity mention 1006. A third evidence chain links the input query 120 to the second-hop information item 1012 via the entity mention 1008, and so on.

The ranking component 908 assigns scores to each evidence chain. In one method, the ranking component 908 interacts with the language model 106 or other generative machine-trained model. The ranking component 908 specifically consults the language model 106 to determine the probability of identifying the input query 120 given an entity mention in a table, or given a specified passage. The ranking component 908 ultimately selects the N evidence chains having the most favorable (e.g., highest) scores. The set of selected N evidence chains constitutes the final knowledge information.

Consider the specific example in which the information item 1004 is table (t) containing entity mention 1006, and the information item 1010 is a passage (p) that is linked to the entity mention 1006. In some implementations, the ranking component 908 scores this item by computing: a) a first score ($S_1(q|t)$) that identifies the probability of generating the input query 120 (q) given the table's entity mention 1006; b) a second score ($S_2(q|p)$) that identifies the probability of generating the input query 120 given the passage in the second-hop information item 1010; and c) a third score ($S_3(t,q)$) that identifies the similarity between the entity mention 1006 and the input query 120. The final score is based on a linear combination of these three scores: $S=S_3(t,q)+\alpha S_1(q|t)+\beta S_2(q|p)$, where $\alpha$ and $\beta$ are environment-specific constants. For an evidence chain that includes only a single hop to a table, the final score is computed based on the truncated linear combination: $S=S_3(t,q)+2\alpha S_1(q|t)$. The final score for a single hop to a passage is computed in an analogous manner.

In some implementations, the ranking component 908 computes $S_1(q|t)$ by submitting the entity mention 1006 to a generative machine-trained model (such as the language model 106 itself), prepended with an instruction: "Please write a question based on this passage." The generative machine-trained model responds by determining the probability of different candidate questions that are appropriate, given the prompt information and the entity mention 1006. The ranking component 908 identifies the probability of the actual input query (q) based on this output information. The ranking component 908 computes $S_2(q|p)$ in the same manner, with the exception that the passage of text from the second-hop information item 1010 is used in place of the entity mention 1006. In some implementations, the ranking component computes the first score $S_3(t,q)$ using the following equation:

$$S_3(t,q) = -\log\left(\frac{\exp(sim(t,q))}{\sum_{t_i\in\mathcal{T}}\exp(sim(t_i,q))}\right). \tag{2}$$

In this equation, sim(t,q) is a vector-based similarity assessment between the input query 120 (q) and the entity mention 1006 from the table (t). The ranking component 908 computes this similarity using a dot product similarity measure or a cosine similarity measure, etc. $\mathcal{T}$ represents a set of first-hop information items, e.g., encompassing other links between entity mentions in the information item 1004 and associated passages. In general terms, Equation (2) computes a vector-based similarity between q and t, and normalizes this measure based on the sum of other vector-based similarity measures for the entire first-hop evidence set $\mathcal{T}$.

The above-described processing explained with respect to the specific examples of FIGS. 4 and 10 is illustrative; other implementations use other retrieval, linking, and ranking strategies. Further, there is no requirement that a first-hop information item contains a table. For instance, in other implementations, the post-processing component 904 identifies evidence chains composed of related passages, without the inclusion of a table.

D. Illustrative Utility System

The utility system 138 (shown in FIG. 1) performs two functions. In a first function, the scoring component 140 computes a usefulness score for a response provided by the language model 106. The utility system 138 then determines whether the usefulness score satisfies a prescribed test, e.g., by determining whether the usefulness score satisfies an environment-specific threshold value. If this test is met, the RAS 104 instructs the user interface component 118 to deliver the response to the user.

As a second function, the feedback-generating component 142 generates feedback information based on the current state information 146. The state information 146 includes any of the aspects itemized above, including, for instance, the input query 120, the knowledge information produced by the KAC 130, the response provided by the language model 106, and the usefulness score computed by the scoring component 140 for this response. In some cases, the utility system 138 invokes the feedback-generating component 142 when the usefulness score computed by the scoring component 140 fails to satisfy the prescribed test. The input-generating component 132 composes an instance of revised model-input information based, in part, on the feedback information.

With respect to the scoring component 140, different implementations of the utility system 138 define what constitutes a "useful" response in different respective ways, e.g., depending on the particular objectives of the application system 110 which relies on the RAS 104. In some cases, the scoring component 140 computes a single-dimensioned usefulness measure. In other cases, the scoring component 140 computes a usefulness measure that is based on a combination (e.g., a weighted linear combination) of different component usefulness measures.

In some examples, the scoring component 140 applies a rule-driven approach to generate a usefulness measure, e.g., using an explicit equation. Alternatively, or in addition, the scoring component 140 uses a machine-trained model to compute a usefulness measure. The training system 116 trains the machine-trained model based on a set of training examples. In some cases, each training example includes at least a candidate response, coupled with a ground-truth label that indicates whether the response is acceptable, with respect to a particular environment-specific criterion of usefulness. In some cases, users manually supply the ground-truth labels. The training system 116 iteratively trains the machined model to minimize the differences between the model's predictions and the ground-truth labels.

Illustrative usefulness measures include any of the following metrics.

a) Response-Knowledge Overlap. In a first usefulness metric, the scoring component 140 determines the similarity between the response provided by the language model 106 and the knowledge information retrieved by the KAC 130. In some implementations, the scoring component 140 computes the similarity by assessing the text tokens of the response that overlap with the tokens of the knowledge information. The scoring component 140 can express token overlap using a number of environment-specific metrics, including a recall measure, a precision measure, and an F1 measure. That is, assume that TP is a number of "true positive" tokens in the response that agree with the knowledge information, FP is a number of "false positive" tokens in the response that are not found in the knowledge information, and FN is a number of "false negative" tokens in the knowledge information that are not found in the response. A Recall measure is computed as TP/(TP+FN), and generally measures how many expected (correct) tokens are present in the response. A Precision measure is computed as TP/(TP+FP), and generally measures the correctness of tokens that are present in the response. The F1 measure is computed as a combination of the Recall and Precision measures, e.g.:

$$F1 = 2 * \frac{\text{Precision} * \text{Recall}}{\text{Precision} + \text{Recall}}. \quad (3)$$

Alternatively, or in addition, the scoring component 140 computes overlap by performing a vector-based comparison between the response and the knowledge information. The scoring component 140 computes this measure by mapping the response to a first vector, mapping the knowledge information to a second vector, and then computing the distance in vector space between the first and second vectors, e.g., using the dot product or cosine similarity. Alternatively, or in addition, the scoring component 140 uses a machine-trained model to assess the overlap.

b) Readability Score. In a second usefulness measure, the scoring component 140 determines the extent to which the response is considered easy to understand, e.g., because it is direct, unambiguous, and uses proper grammar. In some implementations, the scoring component 140 relies on a machine-trained model to compute this type of score based on training examples having human-labeled preference labels.

c) Social Appropriateness. In a third usefulness measure, the scoring component 140 determines the extent to which the response conforms to social norms and mores regarding appropriate language and subject matter. In some implementations, the scoring component 140 relies on a rules-based engine to perform this task, e.g., by making reference to a list of prohibited terms and phrases. Alternatively, or in addition, the scoring component 140 relies on a machine-trained model to compute this score based on training examples having human-labeled preference labels.

d) Environment-Specific Scores. The scoring component 140 computes other scores that reflect the expectations of particular environments. For example, assume that the RAS 104 is applied to the task of providing medical-related advice. The scoring component 140 can promote responses that include words and concepts associated with concrete diagnoses, e.g., as opposed to chit-chat.

Now advancing to the feedback-generating component 142, in some implementations, the feedback-generating component 142 retrieves a pre-generated instance of feedback information from a feedback store (not shown). For example, assume that the scoring component 140 computes three different usefulness scores, the first two of which are below respective environment-specific threshold values. The feedback-generating component 142 responds to this situation by retrieving a first instance of feedback information associated with the first score, and a second instance of feedback information associated with the second score. The feedback-generating component 142 then concatenates these two instances of feedback information into a final instance of feedback information. For example, the feedback information in one example states: "The response does not agree with the external knowledge. The response is not clear and readable."

Alternatively, or in addition the feedback-generating component 142 uses a generative model of any type to map any aspects of the state information 146 to text-based feedback information. In one case, the feedback-generating component 142 relies on the language model 106 itself to perform this function. In other cases, the feedback-generating component 142 relies on a recurrent neural network (RNN) to perform this function, which operates as a sequence-to-sequence transformer. In some cases, the RNN is composed of a sequence of forward-connected, backward-connected, or bi-directionally-connected long short-term memory (LSTM) units. More generally stated, the feedback-generating component 142 receives a sequence of text tokens that describe aspects of the current state, including the last response provided by the language model 106 and the usefulness measure(s) computed by the scoring component 140 for this response. The feedback-generating component 142 maps this sequence of text tokens to the feedback information. In some cases, the feedback-generating component 142 performs this task using auto-regression.

Note that this section described the scoring component 140 and the feedback-generating component 142 as two distinct components, with the feedback-generating component 142 being invoked based on the results of the scoring component 140. In other implementations, the feedback-generating component 142 itself encompasses the role of the scoring component 140, thereby eliminating the need for a separate scoring component 140. Here, for example, the feedback-generating component 142 instructs a generative model (such as the language model 106 itself) to: 1) output a label of "acceptable" when the response is deemed useful; or 2) output critical feedback information when the response is deemed unsatisfactory. Thus, in all cases, reference to a "scoring component" is intended to encompass the case in which this function is subsumed by the operation of the feedback-generating component 142

E. Illustrative Language Model

Figure 11:
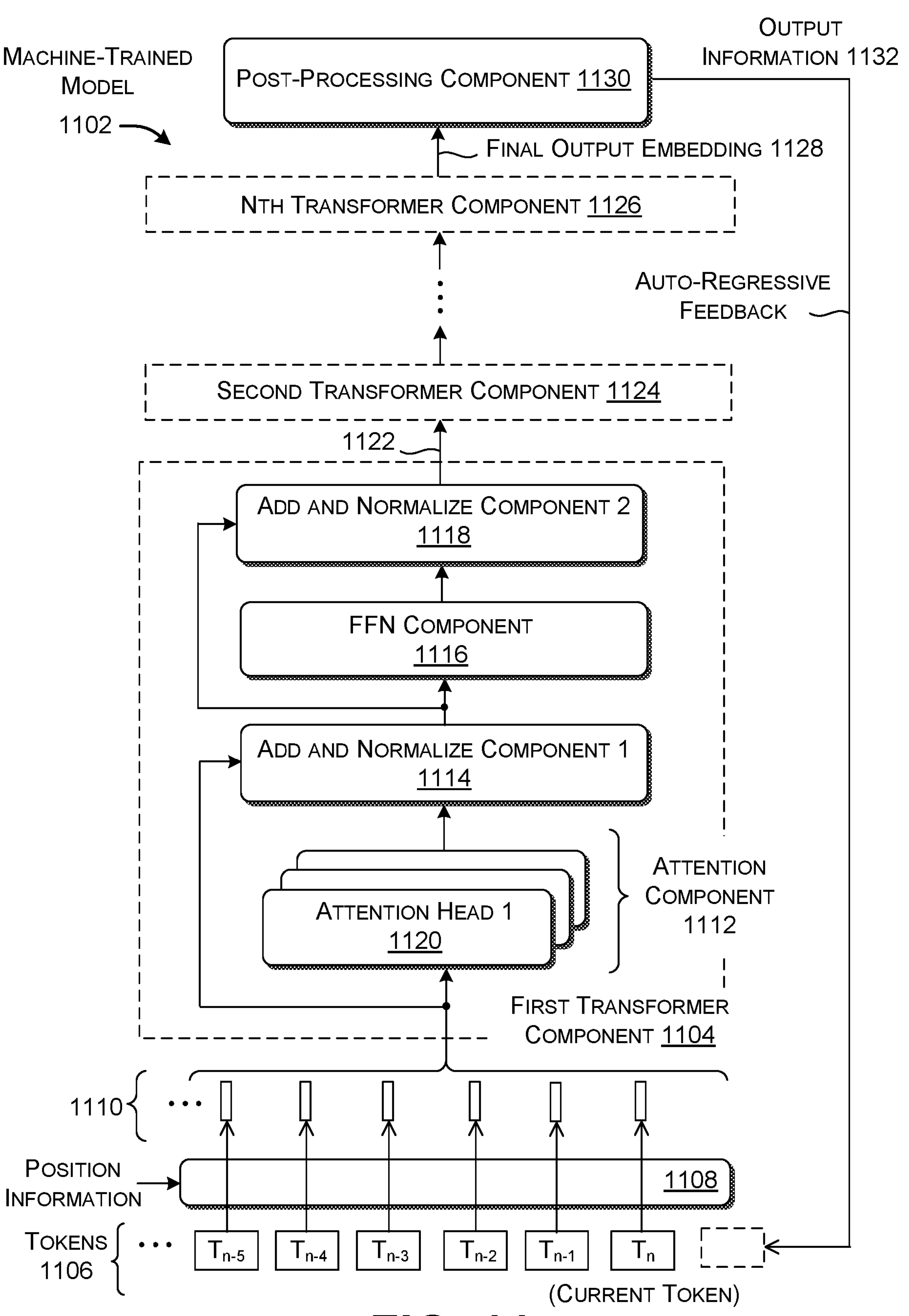
FIG. 11 shows one implementation of the language model of FIG. 1.

FIG. 11 shows one implementation of a language model 1102, which can be used to implement the language model 106 of FIG. 1. The language model 1102 is composed, in part, of a pipeline of transformer components, including a first transformer component 1104. FIG. 11 provides details regarding one way to implement the first transformer component 1104. Although not specifically illustrated, other transformer components of the language model 1102 have the same architecture and perform the same functions as the first transformer component 1104 (but are governed by separate sets of weights).

The language model 1102 commences with the receipt of the model-input information, e.g., as supplied by the input-generating component 132. The model-input information includes a series of linguistic tokens 1106. As used herein, a "token" or "text token" refers to a unit of text having any granularity, such as an individual word, a word fragment produced by byte pair encoding (BPE), a character n-gram, a word fragment identified by the WordPiece algorithm or SentencePiece algorithm, etc. To facilitate explanation, assume that each token corresponds to a complete word.

Next, an embedding component 1108 maps the sequence of tokens 1106 into respective embedding vectors. For example, the embedding component 1108 produces one-hot vectors that describe the tokens, and then uses a machine-trained linear transformation to map the one-hot vectors into the embedding vectors. The embedding component 1108 then adds position information to the respective embedding vectors, to produce position-supplemented embedded vectors 1110. The position information added to each embedding vector describes the embedding vector's position in the sequence of embedding vectors.

The first transformer component 1104 operates on the position-supplemented embedding vectors 1110. In some implementations, the first transformer component 1104 includes, in order, an attention component 1112, a first add-and-normalize component 1114, a feed-forward neural network (FFN) component 1116, and a second add-and-normalize component 1118.

The attention component 1112 performs attention analysis using the following equation:

$$attn(Q, K, V) = \mathrm{Softmax}\left(\frac{QK^T}{\sqrt{d}}\right)V. \quad (4)$$

The attention component 1112 produces query information Q by multiplying the position-supplemented embedded vectors 1110 (or, in some applications, just a last position-supplemented embedding vector associated with a last-received token) by a query weighting matrix $W^Q$. Similarly, the attention component 1112 produces key information K and value information V by multiplying the position-supplemented embedding vectors by a key weighting matrix $W^K$ and a value weighting matrix $W^V$, respectively. To execute Equation (4), the attention component 1112 takes the dot product of Q with the transpose of K, and then divides the dot product by a scaling factor $\sqrt{d}$, to produce a scaled result The symbol d represents the dimensionality of Q and K. The attention component 1112 takes the Softmax (normalized exponential function) of the scaled result, and then multiplies the result of the Softmax operation by V, to produce attention output information. More generally stated, the attention component 1112 determines how much emphasis should be placed on parts of the input information when interpreting other parts of the input information. In some cases, the attention component 1112 is said to perform masked attention insofar as the attention component 1112 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 11 shows that the attention component 1112 is composed of plural attention heads, including a representative attention head 1120. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 1112 concatenates the output results of the attention component's separate attention heads, and then multiplies the results of this concatenation by another weight matrix $W^O$.

The add-and-normalize component 1114 includes a residual connection that combines (e.g., sums) input information fed to the attention component 1112 with the output information generated by the attention component 1112. The add-and-normalize component 1114 then normalizes the output information generated by the residual connection, e.g., by normalizing values in the output information based on the mean and standard deviation of those values. The other add-and-normalize component 1118 performs the same functions as the first-mentioned add-and-normalize component 1114. The FFN component 1116 transforms input information to output information using a feed-forward neural network having any number of layers.

The first transformer component 1104 produces an output embedding 1122. A series of other transformer components (1124, . . . , 1126) perform the same functions as the first transformer component 1104, each operating on an output embedding produced by its immediately preceding transformer component. Each transformer component uses its own level-specific set of machine-trained weights. The final transformer component 1126 in the language model 1102 produces a final output embedding 1128.

A post-processing component 1130 performs post-processing operations on the final output embedding 1128, to produce the final output information 1132. In one case, for instance, the post-processing component 1130 performs a machine-trained linear transformation on the final output embedding 1128, and processes the result of this transformation using a Softmax component (not shown).

In some implementations, the language model 1102 operates in an auto-regressive manner. To operate in this way, the post-processing component 1130 uses the Softmax operation to predict a next token (or, in some cases, a set of the most probable next tokens). The language model 1102 then appends the next token to the end of the sequence of input tokens 1106, to provide an updated sequence of tokens. In a next pass, the language model 1102 processes the updated sequence of tokens to generate a next output token. The language model 1102 repeats the above process until it generates a specified stop token.

Note that the language model 106 shown in FIG. 11 corresponds to a decoder-only implementation of a machine-trained language model. In other examples, the language model 106 encompasses any combination of encoding, decoding, and/or any other functions. For example, in other cases, the language model 106 uses a decoder model that receives encoded information from a separate encoder model. In some implementations, both the encoder model and the decoder model include respective chains of transformer components and/or other type of attention-based logic.

F. Illustrative Processes

Figure 12:
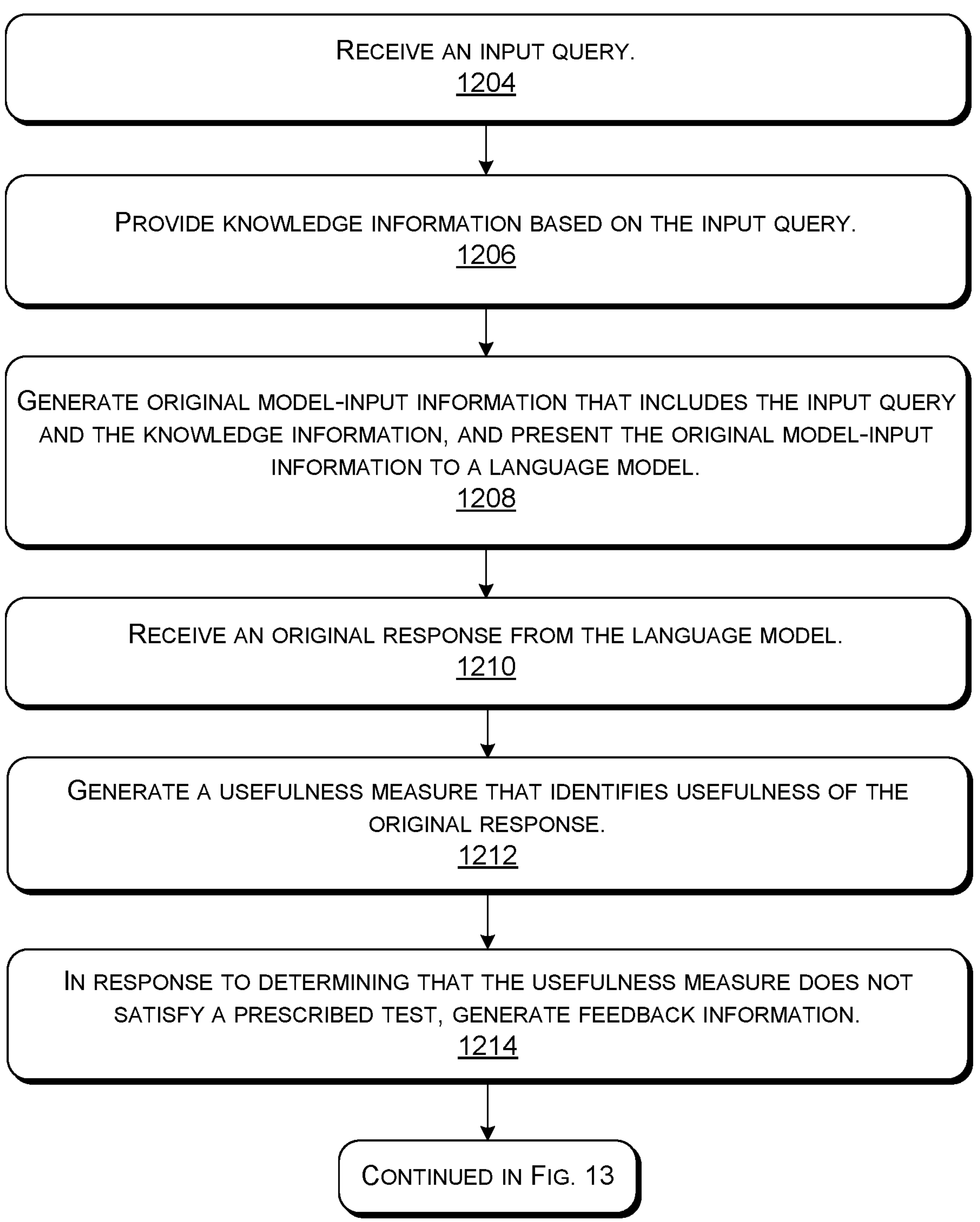
FIGS. 12 and 13 show a process that represents an overview of one manner of operation of the response-augmenting system of FIG. 1.
Figure 13:
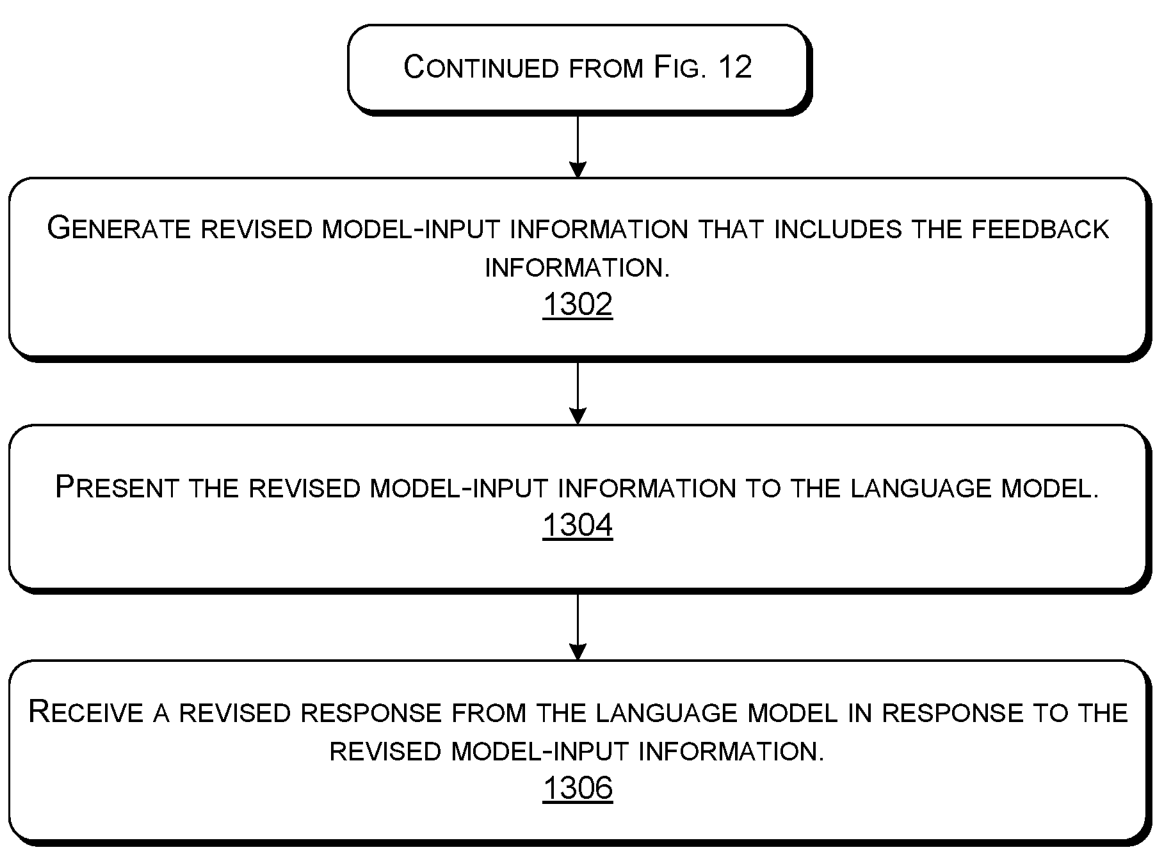

FIGS. 12 and 13 together show a process 1202 that represents an overview of one manner of operation of the RAS 104 of FIG. 1. The process 1202 is expressed as a series of operations performed in a particular order. But the order of these operations is merely representative, and the operations are capable of being varied in other implementations. Further, any two or more operations described below can be performed in a parallel manner. In one implementation, the blocks shown in the process 1202 that pertain to processing-related functions are implemented by the hardware logic circuitry described in connection with FIGS. 14 and 15, which, in turn, is implemented by one or more processors, a computer-readable storage medium, etc.

In block 1204, the RAS 104 receives an input query. In block 1206, the RAS 104 provide knowledge information based on the input query. In block 1208, the RAS 104 generates original model-input information that includes the input query and the knowledge information, and presents the original model-input information to the machine-trained language model 106. In block 1210, the RAS 104 receives an original response from the language model 106. In block 1212, the RAS 104 generates a usefulness measure that identifies usefulness of the original response. In block 1214, in response to determining that the usefulness measure does not satisfy a prescribed test, the RAS 104 generates feedback information. In block 1302 of FIG. 13, the RAS 104 generates revised model-input information that includes the feedback information. In block 1304, the RAS 104 presents the revised model-input information to the language model 106. In block 1306, the RAS 104 receives a revised response from the language model 106 in response to the revised model-input information.

G. Illustrative Computing Functionality

FIG. 14 shows computing equipment 1402 that, in some implementations, is used to implement the computing system 102 of FIG. 1. The computing equipment 1402 includes a set of local devices 1404 coupled to a set of servers 1406 via a computer network 1408. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1408 is implemented as a local area network, a wide area network (e.g., the Internet), one or more point-to-point links, or any combination thereof.

The dashed-line box in FIG. 14 indicates that the functionality of the computing system 102 is capable of being spread across the local devices 1404 and/or the servers 1406 in any manner. For instance, in some cases, each local device, or a group of affiliated local devices, implements the entirety the computing system 102. In other implementations, the servers 1406 implement the entirety of the computing system 102. Here, an individual user interacts with the servers 1406 via a browser application or other local functionality provided by a local device. In other implementations, the functions of the computing system 102 are distributed between each local device and the server 1406. For example, in one case, the servers 1406 implement the language model 106, and each local device implements the remainder of the functions shown in FIG. 1. In another case, aspects of the functions of the KAC 130 are also performed by the servers 1406.

FIG. 15 shows a computing system 1502 that, in some implementations, is used to implement any aspect of the mechanisms set forth in the above-described figures. For instance, in some implementations, the type of computing system 1502 shown in FIG. 15 is used to implement any local computing device or any server shown in FIG. 14. In all cases, the computing system 1502 represents a physical and tangible processing mechanism.

The computing system 1502 includes a processing system 1504 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1502 also includes computer-readable storage media 1506, corresponding to one or more computer-readable media hardware units. The computer-readable storage media 1506 retains any kind of information 1508, such as machine-readable instructions, settings, model weights, and/or other data. In some implementations, the computer-readable storage media 1506 includes one or more solid-state devices, one or more magnetic hard disks, one or more optical disks, magnetic tape, etc. Any instance of the computer-readable storage media 1506 uses any technology for storing and retrieving information. Further, any instance of the computer-readable storage media 1506 represents a fixed or removable unit of the computing system 1502. Further, any instance of the computer-readable storage media 1506 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1502 utilizes any instance of the computer-readable storage media 1506 in different ways. For example, in some implementations, any instance of the computer-readable storage media 1506 represents a hardware memory unit (such as random access memory (RAM)) for storing information during execution of a program by the computing system 1502, and/or a hardware storage unit (such as a hard disk) for retaining/archiving information on a more permanent basis. In the latter case, the computing system 1502 also includes one or more drive mechanisms 1510 (such as a hard drive mechanism) for storing and retrieving information from an instance of the computer-readable storage media 1506.

In some implementations, the computing system 1502 performs any of the functions described above when the processing system 1504 executes computer-readable instructions stored in any instance of the computer-readable storage media 1506. For instance, in some implementations, the computing system 1502 carries out computer-readable instructions to perform each block of the processes described in with reference to FIGS. 12 and 13. FIG. 15 generally indicates that hardware logic circuitry 1512 includes any combination of the processing system 1504 and the computer-readable storage media 1506.

In addition, or alternatively, the processing system 1504 includes one or more other configurable logic units that perform operations using a collection of logic gates. For instance, in some implementations, the processing system 1504 includes a fixed configuration of hardware logic gates, e.g., that are created and set at the time of manufacture, and thereafter unalterable. In addition, or alternatively, the processing system 1504 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1504 effectively incorporates a storage device that stores computer-readable instructions, insofar as the configurable logic units are configured to execute the instructions and therefore embody or store these instructions.

In some cases (e.g., in the case in which the computing system 1502 represents a user computing device), the computing system 1502 also includes an input/output interface 1514 for receiving various inputs (via input devices 1516), and for providing various outputs (via output devices 1518). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1520 and an associated graphical user interface presentation (GUI) 1522. The display device 1520 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1502 also includes one or more network interfaces 1524 for exchanging data with other devices via one or more communication conduits 1526. One or more communication buses 1528 communicatively couple the above-described units together.

The communication conduit(s) 1526 is implemented in any manner, e.g., by a local area computer network, a wide area computer network (e.g., the Internet), point-to-point connections, or any combination thereof. The communication conduit(s) 1526 include any combination of hardwired links, wireless links, routers, gateway functionality, name servers, etc., governed by any protocol or combination of protocols.

FIG. 15 shows the computing system 1502 as being composed of a discrete collection of separate units. In some cases, the collection of units corresponds to discrete hardware units provided in a computing device chassis having any form factor. FIG. 15 shows illustrative form factors in its bottom portion. In other cases, the computing system 1502 includes a hardware logic unit that integrates the functions of two or more of the units shown in FIG. 1. For instance, in some implementations, the computing system 1502 includes a system on a chip (SoC or SOC), corresponding to an integrated circuit that combines the functions of two or more of the units shown in FIG. 15.

The following summary provides a set of illustrative examples of the technology set forth herein.

(A1) According to a first aspect, a method (e.g., the process 1202) is described for interacting with a machine-trained language model (e.g., the language model 106). The method includes: receiving (e.g., in block 1204) an input query; providing (e.g., in block 1204) knowledge information based on the input query; generating (e.g., in block 1206) original model-input information that includes the input query and the knowledge information, and presenting the original model-input information to the language model; receiving (e.g., in block 1208) an original response from the language model; generating (e.g., in block 1210) a usefulness measure that identifies usefulness of the original response; and, in response to determining that the usefulness measure does not satisfy a prescribed test, generating (e.g., in block 1212) revised model-input information that includes feedback information, presenting (e.g., in block 1304) the revised model-input information to the language model, and receiving (e.g., in block 1306) a revised response from the language model in response to the revised model-input information.

(A2) According to some implementations of the method of A1, the language model includes weights that are produced in a pre-training operation, and wherein the weights of the language model remain fixed during training of other machine-trained logic used by the method.

(A3) According to some implementations of the methods of A1 or A2, the language model includes attention logic for assessing relevance to be given to a part of input information fed to the attention logic when interpreting another part of the input information.

(A4) According to some implementations of any of the methods of A1-A3, the method further incudes generating and presenting one or more revised instances of model-input information until it is determined that the language model has generated a response that satisfies the prescribed test.

(A5) According to some implementations of any of the methods of A1-A4, the generating of the revised model-input information is performed upon receiving a user request to generate the revised response.

(A6) According to some implementations of any of the methods of A1-A5, different actions performed by the method are chosen by a state machine based on state information and a policy, the state information describing aspects of a current dialogue state, and the policy expressing logic for mapping different instances of state information to the different actions.

(A7) According some implementations of the method of A6, the state information describes aspects of a current dialogue turn, including at least: the query; the knowledge information; and a last-received response from the language model.

(A8) According to some implementations of the method of A7, the state information also describes a history of previous dialogue turns, prior to the current dialogue turn.

(A9) According some implementations of the method of A6, the policy is chosen to maximize attainment of an objective, and wherein an extent to which an action advances the objective is expressed by a reward signal.

(A10) According to some implementations of any of the methods of A1-A9, the providing knowledge information includes: retrieving initial knowledge information that matches the input query, from one or more knowledge sources; identifying a chain of evidence based on the initial knowledge; and validating the chain of evidence, to produce final knowledge information.

(A11) According to some implementations of any of the methods of A1-A10, the generating of the usefulness measure includes assessing an extent of overlap between the original response and the knowledge information.

(A12) According to some implementations of any of the methods of A1-A11, the method further includes generating the feedback information by retrieving pre-generated prompt information from a data store.

(A13) According to some implementations of any of the methods of A1-A12, the method further includes generating the feedback information using a generative machine-trained model, based on state information that describes aspects of a current dialogue state.

In yet another aspect, some implementations of the technology described herein include a computing system (e.g., the computing system 1502) that includes a processing system (e.g., the processing system 1504) having a processor. The computing system also includes a storage device (e.g., the computer-readable storage media 1506) for storing computer-readable instructions (e.g., information 1508). The processing system executes the computer-readable instructions to perform any of the methods described herein (e.g., any individual method of the methods of A1-A13).

In yet another aspect, some implementations of the technology described herein include a computer-readable storage medium (e.g., the computer-readable storage media 1506) for storing computer-readable instructions (e.g., the information 1508). A processing system (e.g., the processing system 1504) executes the computer-readable instructions to perform any of the operations described herein (e.g., the operation in any individual method of the methods of A1-A13).

More generally stated, any of the individual elements and steps described herein are combinable into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1512 of FIG. 15. The term "logic" likewise encompasses various physical and tangible mechanisms for performing a task. For instance, each processing-related operation illustrated in the flowcharts of FIGS. 12 and 13 corresponds to a logic component for performing that operation.

This description may have identified one or more features as optional. This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for interacting with a machine-trained language model, comprising:

receiving an input query;

providing knowledge information based on the input query;

generating original model-input information that includes the input query and the knowledge information, and presenting the original model-input information to the language model;

receiving an original response from the language model, the language model being a generative model trained to auto-regressively predict tokens to follow an initial set of tokens;

programmatically generating a usefulness measure that identifies usefulness of the original response;

in response to determining that the usefulness measure does not satisfy a prescribed test, generating revised model-input information that includes feedback information, presenting the revised model-input information to the language model, and receiving a revised response from the language model in response to the revised model-input information; and generating and presenting one or more revised instances of model-input information until it is determined that the language model has generated a response that satisfies the prescribed test.

2. The method of claim 1, wherein the language model includes weights that are produced in a pre-training operation, and wherein the weights of the language model remain fixed during training of other machine-trained logic used by the method.

3. The method of claim 1, wherein the language model includes attention logic for assessing relevance to be given to a part of input information fed to the attention logic when interpreting another part of the input information.

4. The method of claim 1, wherein the generating of the revised model-input information is performed upon receiving a user request to generate the revised response.

5. The method of claim 1, wherein different actions performed by the method are chosen by a state machine based on state information and a policy, the state information describing aspects of a current dialogue state, and the policy expressing logic for mapping different instances of state information to the different actions.

6. The method of claim 5, wherein the state information describes aspects of a current dialogue turn, including at least:

the query;

the knowledge information; and a last-received response from the language model.

7. The method of claim 6, wherein the state information also describes a history of previous dialogue turns, prior to the current dialogue turn.

8. The method of claim 5, wherein the policy is chosen to maximize attainment of an objective, and wherein an extent to which an action advances the objective is expressed by a reward signal.

9. The method of claim 1, wherein the providing knowledge information comprises:

retrieving initial knowledge information that matches the input query, from one or more knowledge sources;

identifying a chain of evidence based on the initial knowledge; and validating the chain of evidence, to produce final knowledge information.

10. The method of claim 1, wherein the generating of the usefulness measure includes assessing an extent of overlap between the original response and the knowledge information.

11. The method of claim 1, further comprising generating the feedback information by retrieving pre-generated prompt information from a data store.

12. The method of claim 1, further comprising generating the feedback information using another generative machine-trained model, based on state information that describes aspects of a current dialogue state.

13. The method of claim 1, further comprising generating the feedback information using the language model, based on state information that describes aspects of a current dialogue state.

14. A computing system for interacting with a machine-trained language model, comprising:

computer-readable storage media including:

an instruction data store for storing computer-readable instructions; and a state data store for storing state information, the state information describing aspects of a current dialogue state; and a processing system including one or more processors for executing the computer-readable instructions based on the state information in the state data store, to perform operations including:

receiving an input query;

providing knowledge information based on the input query;

generating original model-input information including the input query and the knowledge information, and presenting the original model-input information to the language model;

receiving an original response from the language model, the language model being a generative model trained to auto-regressively predict tokens to follow an initial set of tokens;

programmatically generating a usefulness measure that identifies usefulness of the original response;

in response to determining that the usefulness measure does not satisfy a prescribed test, generating revised model-input information that includes feedback information, presenting the revised model-input information to the language model, and receiving a revised response from the language model in response to the revised model-input information; and generating and presenting one or more revised instances of model-input information until it is determined that the language model has generated a response that satisfies the prescribed test.

15. The computing system of claim 14, wherein the processing system implements a state machine for performing different actions based on the state information and a policy, the policy expressing logic for mapping different instances of state information to the different actions.

16. The computing system of claim 14, wherein the operations further include generating the feedback information by retrieving pre-generated prompt information from a data store.

17. The computing system of claim 14, wherein the operations further include generating the feedback information using another generative machine-trained model, based on the state information.

18. The computing system of claim 14, wherein the operations further include generating the feedback information using the language model, based on the state information.

19. A computer-readable storage medium for storing computer-readable instructions, a processing system executing the computer-readable instructions to perform operations, the operations comprising:

receiving an input query;

providing knowledge information based on the input query;

generating original model-input information that includes the input query and the knowledge information, and presenting the original model-input information to machine-trained a language model;

receiving an original response from the language model, the language model being a generative model trained to auto-regressively predict tokens to follow an initial set of tokens;

programmatically generating a usefulness measure that identifies usefulness of the original response;

in response to determining that the usefulness measure does not satisfy a prescribed test, generating feedback information;

generating revised model-input information that includes the feedback information;

presenting the revised model-input information to the language model;

receiving a revised response from the language model in response to the revised model-input information; and generating and presenting one or more revised instances of model-input information until it is determined that the language model has generated a response that satisfies the prescribed test.

20. The computer-readable storage medium of claim 19, wherein the operations further include generating the feedback information using the language model, based on state information.

* * * * *